United States Patent [19]
Hirai et al.

[11] Patent Number: 6,051,614
[45] Date of Patent: Apr. 18, 2000

[54] METHOD FOR PREPARING A NON-AQUEOUS DISPERSION OF PARTICLES OF A METAL AND/OR A METAL COMPOUND

[75] Inventors: Hidefumi Hirai, 14-8, Kamiishihara 1-chome, Chofu-shi, Tokyo; Hyoya Shiozaki, Kamakura; Hotaka Aizawa, Abiko, all of Japan

[73] Assignee: Hidefumi Hirai

[21] Appl. No.: 07/997,169

[22] Filed: Dec. 28, 1992

[30] Foreign Application Priority Data

Dec. 28, 1991 [JP] Japan ................................. 3-358548

[51] Int. Cl.$^7$ .............................. B01D 12/00; B01F 3/00
[52] U.S. Cl. ........................ 516/20; 502/173; 502/339; 502/344; 252/62.57
[58] Field of Search .................... 252/308, 309, 252/314, 62.53, 303; 502/173, 339, 344; 516/20

[56] References Cited

U.S. PATENT DOCUMENTS

| | | | |
|---|---|---|---|
| 1,431,079 | 10/1922 | Acheson | 252/309 |
| 2,383,653 | 8/1945 | Kirk | 252/309 |
| 2,408,654 | 10/1946 | Kirk | 252/309 |
| 3,042,540 | 7/1962 | Cabot | 106/504 |
| 3,625,856 | 12/1971 | Schaefer et al. | 252/309 |
| 3,884,713 | 5/1975 | Langley et al. | 106/499 |
| 3,912,677 | 10/1975 | Baker et al. | 523/205 |
| 4,425,261 | 1/1984 | Stenius et al. | 502/339 |
| 4,645,611 | 2/1987 | Campbell et al. | 252/62.53 |
| 4,888,248 | 12/1989 | Hirai et al. | 428/403 |
| 4,946,623 | 8/1990 | Tabony | 252/314 |
| 4,954,473 | 9/1990 | Gatsis | 502/173 |
| 5,147,841 | 9/1992 | Wilcoxon | 252/309 |
| 5,213,895 | 5/1993 | Hirai et al. | 428/403 |

FOREIGN PATENT DOCUMENTS

| | | | |
|---|---|---|---|
| 0 206 907 | 12/1986 | European Pat. Off. | 252/308 |
| 53-109879 | 9/1978 | Japan | 502/173 |
| 0 2048-036 | 2/1990 | Japan | 252/308 |
| 310529 | 10/1970 | U.S.S.R. | 252/309 |

OTHER PUBLICATIONS

Shugar et al., *Chemical Technicians Ready Reference Handbook*, (McGraw Hill, NY, 1981) Month unavailable. pp. 311–312.

Hirai, H. J. Macromolecular Sci.–Chem., vol. A13, No. 5, pp. 633–649 (1979). Month unavailable.

Boutonnet, M. et al. *Colloids and Surfaces*, 5, pp. 209–225 (1982). Month unavailable.

Nakao, Y. et al. J. Colloid and Interface Sci. vol. 110, No. 1, pp. 82–87, (1986) Month unavailable.

Meguro, K. et al. Colloids and Surfaces, 34, pp. 381–388 (1988/89). Month unavailable.

Satoh, N. et al. J. Colloid and Interface Sci., vol. 131, No. 1, pp. 161–165 (1989). Month unavailable.

Satoh, N. et al. Bull. Chem. Soc. Jpn, vol. 62, No. 6, 1758–1763 (1989). Month unavailable.

Collins, I.R. et al. J. Dispersion Science and Tech., 12 (5 & 6), 403–415 (1991).

*Primary Examiner*—Shean C. Wu
*Assistant Examiner*—Daniel S. Metzmaier
*Attorney, Agent, or Firm*—Birch, Stewart, Kolasch & Birch, LLP

[57] ABSTRACT

Disclosed is a method for preparing a non-aqueous dispersion of particles of a metal and/or a metal compound, which comprises contacting an aqueous dispersion of particles of a metal and/or a metal compound with a water-immiscible, non-aqueous liquid in the presence of a surfactant and in the presence or absence of a water-soluble inorganic acid salt and/or a water-soluble organic acid salt exhibiting substantially no surface activity, wherein when the contacting of the aqueous dispersion with the non-aqueous liquid is conducted in the absence of the salt, the salt is added after the contacting, thereby causing the particles to be migrated from the aqueous dispersion into the non-aqueous liquid.

15 Claims, No Drawings

METHOD FOR PREPARING A NON-AQUEOUS DISPERSION OF PARTICLES OF A METAL AND/OR A METAL COMPOUND

BACKGROUND OF THE INVENTION

1. Field of the Invention

The present invention relates to a method for preparing a non-aqueous dispersion of particles of a metal and/or a metal compound. More particularly, the present invention is concerned with a method for preparing a non-aqueous dispersion of particles of a metal and/or a metal compound from an aqueous dispersion of the same particles, which comprises contacting an aqueous dispersion of particles of a metal and/or a metal compound with a water-immiscible, non-aqueous liquid in the presence of a surfactant and in the presence or absence of a water-soluble inorganic acid salt and/or a water-soluble organic acid salt exhibiting substantially no surface activity, wherein when the contacting of the aqueous dispersion with the non-aqueous liquid is conducted in the absence of the salt, the salt is added after the contacting, thereby causing the particles to be migrated from the aqueous dispersion into the non-aqueous liquid.

2. Discussion Of Related Art

With respect to the method for chemically preparing metallic particles and/or metal compound particles, a method has conventionally been known in which a metal salt as a starting material is dissolved in water and/or a water-miscible liquid and the resultant solution is then treated with a suitable agent, such as a reducing agent, a boride-forming agent, a sulfide-forming agent or a hydroxide-forming agent, to thereby prepare metallic particles and/or metal compound particles dispersed in the form of a dispersion thereof in the water and/or the water-miscible liquid.

Metallic particles and/or metal compound particles, in the form of a composite having these particles borne on an inorganic or organic solid carrier, are used as catalysts, electronic materials, magnetic recording materials, gas sensor materials and the like. Further, metallic particles and/or metal compound particles, in the form of a composite having these particles dispersed in an organic resin, are used as electrically conductive pastes and the like. However, in either case, when the metallic particles and/or metal compound particles contain water, various disadvantages are likely to be caused. It is also known that when metallic particles and/or metal compound particles containing water are used as a pigment for an inorganic frit, the color tone of the frit is disadvantageously deteriorated.

One of the conventional methods for preparing metallic particles and/or metal compound particles dispersed in a water-immiscible, non-aqueous liquid is the so-called in-gas vaporizing method. One example of this method comprises vaporizing a metal by heating in a helium atmosphere at 10 to 50 Torr, guiding the resultant metal vapor with the aid of argon gas, mixing the metal vapor with a non-aqueous liquid vapor in the course of the guidance of the metal vapor, condensing the resultant mixture in a cold trap of liquid nitrogen, and then fusing the resultant condensate by heating, thereby obtaining a dispersion of metallic particles. This method has disadvantages in that expensive facilities are required and that energy, such as electricity, is consumed in a large quantity. Further, with respect to this method, in N. Satoh and K. Kimura, "The Bulletin of Chemical Society of Japan," Vol. 62, pp.1758–1763 (1989), it is described that when n-hexane is used as a non-aqueous liquid, metallic particles are aggregated and precipitated with respect to all types of metals, thereby rendering it practically impossible to obtain a non-aqueous dispersion of the metallic particles. Further, when benzene is used as a non-aqueous liquid, metallic particles are aggregated and precipitated with respect to almost all types of metals, thereby rendering it practically impossible to obtain a non-aqueous dispersion of metallic particles.

Another method is known as a microemulsion method. In this method, an oil-soluble surfactant forms microemulsion particles of reversed micelles in a water-immiscible, non-aqueous liquid. Into the resultant microemulsion particles is inevitably incorporated a very small amount of water, and the resultant water-containing microemulsion particles are dispersed in a large quantity of the non-aqueous liquid. When the very small amount of water has a noble metal salt dissolved therein, addition of a reducing agent gives a dispersion of noble metallic particles and/or noble metal compound particles. In this method, however, the amount of water serving to dissolve the noble metal salt is too small to obtain a dispersion having a high particle concentration. Further, the water cannot be prevented from entering, as microemulsion particles of reversed micelles, into a non-aqueous liquid.

Further, the so-called metal salt-extraction method has recently been employed. In this method, a noble metal salt is migrated from an aqueous solution thereof into a non-aqueous liquid phase using an extracting agent, followed by reduction with a reducing agent added to the aqueous phase, to thereby prepare a non-aqueous dispersion of noble metallic particles. However, this method has disadvantages in that a large amount of an extracting agent capable of dissolving in a non-aqueous liquid is required, and that a large amount of the extracting agent is inevitably contained in the prepared non-aqueous dispersion of noble metallic particles. Separation of the extracting agent from the obtained dispersion is difficult.

As mentioned above, although a non-aqueous dispersion of metallic particles and/or metal compound particles has high utility, the preparation thereof has been difficult. Therefore, the development of a method for easily preparing a non-aqueous dispersion having metallic particles and/or metal compound particles uniformly dispersed therein has long been desired.

SUMMARY OF THE INVENTION

In these difficult situations, the present inventors have made extensive and intensive studies with a view toward developing a method for preparing a non-aqueous dispersion of metallic particles and/or metal compound particles dispersed in a water-immiscible, non-aqueous liquid. As mentioned above, the non-aqueous dispersion of metallic particles and/or metal compound particles can be advantageously used for producing electronic materials, magnetic materials, magnetic recording materials, optical materials, gas sensor materials, catalytic materials, sintered materials and the like. As a result, it has been unexpectedly found that when an aqueous dispersion of metallic particles and/or metal compound particles is contacted with a water-immiscible, non-aqueous liquid in the presence of a surfactant and in the presence or absence of a water-soluble inorganic acid salt and/or a water-soluble organic acid salt exhibiting substantially no surface activity, wherein when the contacting of the aqueous dispersion with the non-aqueous liquid is conducted in the absence of the salt, the salt is added after the contacting, the particles are migrated from the aqueous dispersion into the non-aqueous liquid, thereby obtaining a two-phase mixture comprised of an aqueous phase substantially free of the particles and a non-aqueous dispersion phase having metallic particles and/or metal compound particles dispersed therein. The desired non-aqueous dispersion can be isolated from the two-phase mixture. In the method of the present invention, no special equipment is required, and energy can be saved. Further, a large quantity of the non-aqueous dispersion can be easily prepared.

In the conventional methods, it has been difficult to prepare a non-aqueous dispersion having a high concentration of metallic particles and/or metal compound particles. By contrast, according to the method of the present invention, a non-aqueous dispersion having a high particle concentration of metallic particles and/or metal compound particles can be prepared by decreasing the amount of a non-aqueous liquid relative to the amount of an aqueous dispersion, or by repeatedly contacting the aqueous dispersion with the obtained non-aqueous dispersion.

DETAILED DESCRIPTION OF THE INVENTION

Accordingly to the present invention, there is provided a method for preparing a non-aqueous dispersion of metallic particles and/or metal compound particles, which comprises:

(1) contacting an aqueous dispersion of particles of at least one member selected from the group consisting of a metal and a metal compound with a water-immiscible, non-aqueous liquid in the presence of a surfactant and in the presence or absence of at least one salt selected from the group consisting of a water-soluble inorganic acid salt and a water-soluble organic acid salt exhibiting substantially no surface activity, wherein when the contacting of the aqueous dispersion with the non-aqueous liquid is conducted in the absence of the salt, the salt is added after the contacting, thereby causing the particles to be migrated from the aqueous dispersion into the non-aqueous liquid to thereby obtain a two-phase mixture comprised of a non-aqueous dispersion phase having the particles dispersed therein and an aqueous phase substantially free of the particles; and (2) isolating the non-aqueous dispersion from the two-phase mixture.

In the method of the present invention, it is required that the contacting of an aqueous dispersion of particles of a metal and/or a metal compound with a water-immiscible, non-aqueous liquid be conducted in the presence of a surfactant and in the presence or absence of a water-soluble inorganic acid salt and/or a water-soluble organic acid salt exhibiting substantially no surface activity. When the contacting of the aqueous dispersion with the non-aqueous liquid is conducted in the absence of the salt, it is necessary that the salt be added after the contacting. The contacting of the aqueous dispersion with the non-aqueous liquid can be easily performed by mixing under stirring or by ultrasonic wave treatment. By the contacting of the aqueous dispersion with the non-aqueous liquid under the above-mentioned conditions, the particles are caused to be migrated from the aqueous dispersion into the non-aqueous liquid to thereby obtain a two-phase mixture comprised of a non-aqueous dispersion phase having the particles dispersed therein and an aqueous phase substantially free of the particles. When the obtained two-phase mixture is allowed to stand still, the mixture separates into a layer of non-aqueous dispersion phase having the particles dispersed therein and a layer of aqueous phase substantially free of the particles. By removing the layer of aqueous phase, there can be obtained a non-aqueous dispersion, in which the particles are uniformly dispersed and the dispersion is stable for a long period of time.

As a dispersion medium of the aqueous dispersion, water is usually employed, however, a polar solvent, such as methyl alcohol and ethyl alcohol, may be contained in a small amount as long as the solvent does not impair the non-miscibility of the aqueous dispersion with a water-immiscible, non-aqueous liquid.

The aqueous dispersion of metallic particles and/or metal compound particles to be used in the method of the present invention may also contain a surfactant and/or an organic polymer for dispersion stabilization of the aqueous dispersion. When the aqueous dispersion contains the surfactant for dispersion stabilization, the surfactant can serve as at least a part of the indispensable surfactant in the step of contacting the aqueous dispersion with the non-aqueous liquid. The surfactant and organic polymer to be used for stabilizing the aqueous dispersion is described below in detail.

Examples of metallic particles of the aqueous dispersion to be used in the present invention include particles of gold, silver, platinum, rhodium, palladium, ruthenium, iridium and osmium. The aqueous dispersion of metallic particles of these metal species can be obtained by subjecting an aqueous solution of a metal salt or a metal compound, such as chloroauric acid, silver nitrate, chloroplatinic acid, rhodium (III) chloride, palladium (II) chloride, ruthenium (III) chloride, chloroiridium acid salt or osmium (VII) oxide, to a treatment with a reducing agent.

Examples of reducing agents to be used for preparing an aqueous dispersion of metallic particles include methanol, ethanol, molecular hydrogen, phosphorus, hydrazine, sodium borohydride, citric acid, sodium citrate, tannic acid, oxalic acid, formaldehyde and sodium hydrogensulfite. Instead of the reduction by means of the above agents, the reduction of metal salts or metal compounds can be performed by actinic ray radiation or ultrasonic wave radiation.

It is known that when a metal salt or a metal compound is reduced in an aqueous solution thereof in the presence of a cationic surfactant, such as stearyltrimethylammonium chloride, an anionic surfactant, such as sodium dodecylbenzenesulfonate, or a non-ionic surfactant, such as poly(ethylene glycol) mono-paranonylphenylether, an aqueous dispersion of metallic particles in which the particles are stably dispersed can be obtained. The thus obtained aqueous dispersion of metallic particles can also be used in the present invention. The amount of the surfactant to be contained in the aqueous dispersion can be from 0.001 to 2% by weight, based on the weight of water of the aqueous dispersion.

It is known that when a metal salt or a metal compound is reduced in an aqueous solution thereof in the presence of an organic polymer having a protective colloid activity, an aqueous dispersion of metallic particles in which the particles are stably dispersed can be obtained. The thus obtained aqueous dispersion in which the metallic particles are substantially, individually and independently protected by the organic polymer, can also be used in the present invention. The organic polymer can be used in an amount of from 0.01 to 500 in terms of a molar ratio of monomer units constituting the organic polymer to metal atoms of the metallic particles and/or metal compound particles.

A particle size of the thus obtained metallic particles is in the range of from 1 nm to 1 $\mu$m. The concentration thereof is not specifically limited. However, it is preferred that the concentration be in the range in which the aqueous dispersion of the metallic particles is stable.

Examples of metal compound particles of the aqueous dispersion having metal compound particles dispersed therein to be used in the present invention include particles of metal borides, metal sulfides, metal hydroxides and metal oxides. Metal species are not specifically limited. However, preferred examples of metal species include iron, nickel, cobalt, cadmium, copper, barium, aluminum, indium, tin, titanium, tantalum, silicon and zirconium.

The aqueous dispersion of the metal compound particles can be obtained by a conventional method in which an aqueous solution of a metal salt or a metal alkoxide corresponding to the desired metal species is treated with, for example, a boride-forming agent, a sulfide-forming agent or a hydroxide-forming agent. For example, an aqueous dispersion of particles of a metal boride, such as nickel boride, cobalt boride, iron boride or zirconium boride, can be obtained by treating a solution of a metal salt corresponding to the desired metal species with a boride-forming agent, such as sodium tetrahydroborate or potassium tetrahydroborate. An aqueous dispersion of particles of a metal sulfide, such as copper sulfide, cobalt sulfide, nickel sulfide or cadmium sulfide, can be obtained by treating an aqueous solution of a metal salt corresponding to the desired metal species with a sulfide-forming agent, such as sodium thiosulfate, sodium sulfide, ammonium sulfide, hydrogen sulfide or zirconium sulfide. An aqueous dispersion of particles of a metal hydroxide, such as iron hydroxide, aluminum hydroxide, indium hydroxide, tin hydroxide and titanium hydroxide can be obtained by subjecting an aqueous solution of a metal salt or a metal alkoxide corresponding to the desired metal species to a treatment for hydrolysis. An aqueous dispersion of particles of a metal oxide, such as magnetite, ferrite, tantalum oxide or zirconium oxide, can be obtained by adding sodium hydroxide to a solution of a metal salt corresponding to the desired metal species to render alkaline the solution and heat-aging the resultant alkaline solution. An aqueous dispersion of particles of another type of metal oxide, e.g., barium titanate, can be obtained by dissolving barium alkoxide and titanium alkoxide in an alcohol and adding water to the resultant solution.

The particle size of the thus obtained metal compound particles in the aqueous dispersion is in the range of from 1 nm to 3 μm. The particle concentration is not specifically limited. However, it is preferred that the concentration be in the range in which the aqueous dispersion of the metal compound particles is stable.

In the method of the present invention, the types of non-aqueous liquids to be contacted with an aqueous dispersion of metallic particles and/or metal compound particles are not specifically limited as long as the non-aqueous liquids are water-immiscible. Preferred examples of non-aqueous liquids include chloroform, cyclohexane, benzene, n-hexane, diethylether, methylisobutylketone, carbon tetrachloride, methylene chloride, ethyl acetate, petroleum ether and silicone oil.

Examples of surfactants to be used in the present invention include an anionic surfactant, a cationic surfactant, a non-ionic surfactant. Examples of anionic surfactants include an alkali metal salt of a fatty acid, a higher alcohol sulfate ester and an alkali metal salt of alkylbenzenesulfonic acid. Examples of cationic surfactants include primary to tertiary amine salts, a quarternary ammonium salt and pyridinium salt, each having an alkyl chain. Examples of non-ionic surfactants include esters of a polyhydric alcohol with a fatty acid and ethylene oxide polymerization adducts. If desired, an amphoteric surfactant and an oil-soluble surfactant can also be used. Examples of amphoteric surfactants include those of a sulfobetaine type, a betaine type and an amino acid type thereof. Examples of oil-soluble surfactants include a quarternary ammonium salt having at least two long alkyl chains, and an adduct of a sulfonic acid group to a diester of succinic acid with a higher alcohol. Of the above-mentioned types of surfactants, anionic surfactants and cationic surfactants are especially preferred.

Examples of water-soluble inorganic acid salts and/or organic acid salts exhibiting substantially no surface activity to be used in the present invention include water-soluble, sulfates, halides, acetates, nitrate, carbonates, citrates and tartrates of ammonium lithium, sodium, potassium, magnesium, calcium, strontium, barium, aluminum, lanthanum, and the like.

The types of organic polymers which can be used for dispersion stabilization of an aqueous dispersion of metallic particles and/or metal compound particles to be used in the present invention are not specifically limited as long as the polymers have a protective colloid activity. Preferred examples of organic polymers include poly(N-vinyl-2-pyrrolidone), poly(vinyl alcohol), a copolymer of N-vinyl-2-pyrrolidone with acrylamide or methyl acrylate, poly (methyl vinyl ether), gelatin, sodium casein, gum arabic and the like.

A number average molecular weight of the organic polymers as a protective polymer is in the range of from 3,000 to 1,000,000.

A procedure for preparing an aqueous dispersion of metallic particles and/or metal compound particles can be practiced in accordance with a conventional method, for example, the method described in "Shin-Jikken Kagaku Koza" (Lecture of New Experimental Chemistry), Vol. 18 "Kaimen to Koroido" (Interface and Colloid), pp. 319–340, edited by Nippon Kagakukai (The Chemical Society of Japan), published by Maruzen, Japan (1977).

Further, an aqueous dispersion of metallic particles in which the dispersion state of the particles is stabilized by adding a surfactant thereto can be prepared in accordance with a conventional method, for example, that described in Y. Nakao and K. Kaeriyama, "Journal of Colloid and Interface Science", Vol. 110, No. 1, pp. 82–87, Japan (March, 1986).

An aqueous dispersion of metallic particles in which dispersion is stabilized by adding an organic polymer having a protective colloid activity can be prepared in accordance with a conventional method, for example, that described in H. Hirai, "Journal of Macro-molecular Science-Chemistry", Vol. A13, No. 5, pp. 633–649 (1979).

Among the aqueous dispersions of metallic particles and/or metal compound particles which dispersions are prepared in a water-soluble, non-aqueous liquid such as methanol or in a mixture of such a water-soluble, non-aqueous liquid and water, there are aqueous dispersions (in which the particle dispersion are usually stabilized with the aid of a surfactant and/or an organic polymer) which can be subjected to a treatment for removing the water-soluble, non-aqueous liquid under moderate conditions (for example, by distillation at room temperature under reduced pressure), followed by addition of water, so that an aqueous dispersion free of the water-soluble, non-aqueous liquid can be obtained. Such aqueous dispersions which are stable, can be easily prepared by the above-mentioned methods of Nakao et al. and Hirai.

The particle concentration of the aqueous dispersion of metallic particles and/or metal compound particles is in the range of from 0.005 to 100 mmol/liter in terms of metal atoms, generally in the range of from 0.02 to 70 mmol/liter. However, the higher particle concentration is preferred.

In practicing the method of the present invention, for example, a predetermined amount of an aqueous dispersion of metallic particles and/or metal compound particles is taken out, and a surfactant is added in an amount of from 0.01 to 5% by weight, preferably from 0.05 to 0.5% by weight, based on the weight of water of the aqueous dispersion. To the resultant aqueous dispersion is added a non-aqueous liquid in an amount of from 0.01 to 50 times, preferably 0.05 to 10 times by volume the amount of the aqueous dispersion, followed by mixing the obtained mixture for 15 minutes to 8 hours, preferably for 2 to 6 hours while stirring, thereby dispersing the non-aqueous liquid in the aqueous dispersion, or vice versa, toward emulsification. In this instance, it is preferred that the temperature be maintained constant in the range of from 0 to 90° C., preferably from 20 to 60° C. Thereafter, a water-soluble inorganic acid salt and/or a water-soluble organic acid salt exhibiting substantially no surface activity is added thereto in an amount of 0.005 to 30% by weight, preferably 0.01 to 15% by weight, based on the weight of water of the aqueous dispersion, followed by stirring for 30 seconds to 30 minutes, preferably for 1 to 2 minutes. Thus, substantially all of the particles are migrated from the aqueous phase to the non-aqueous liquid phase. Thereafter, the resultant mixture is allowed to stand still for 2 hours to 2 days, thereby causing phase-separation into a nonaqueous liquid phase having the particles dispersed therein and an aqueous phase substantially free of the particles. Then, the non-aqueous liquid having the particles dispersed therein can be separated and isolated by means of a separating funnel or by sucking out the non-aqueous liquid phase. All or most of the organic polymer is present in an aggregated form in a phase boundary between the aqueous phase and the non-aqueous liquid phase and, therefore, the aggregated organic polymer can be easily removed. When a reducing agent, a boride-forming agent, a hydroxide-forming agent, or a reaction product thereof has been present in the aqueous dispersion, all or most of such an agent is present in a dissolved state in the aqueous phase or in the form of a composite of the agent with the aggregated organic polymer and the like. With respect to the surfactant, it is noted that, in most cases, a part of the surfactant used is present in an aggregated form in a phase boundary between the aqueous phase and the non-aqueous liquid phase whereas a part of the surfactant is present in the non-aqueous liquid phase. However, in some cases, for example, when magnesium chloride has been used as the water-soluble inorganic salt in the method of the present invention, substantially all of the surfactant is present in the non-aqueous liquid phase having the particles dispersed therein.

As mentioned above, in the method for preparing a non-aqueous dispersion of metallic particles and/or metal compound particles according to the present invention, it is preferred that a non-aqueous liquid and a surfactant are successively added to an aqueous dispersion having metallic particles and/or metal compound particles dispersed therein while stirring to thereby homogeneously emulsify the mixture, and then a water-soluble inorganic and/or a water-soluble organic salt exibiting substantially no surface activity be added to the emulsion while stirring. As shown in Examples 2 and 40 below, however, it is possible that a water-soluble inorganic acid salt and/or a water-soluble organic acid salt exhibiting substantially no surface activity is added simultaneously with the addition of the aqueous dispersion of the particles to the non-aqueous liquid. The water-soluble inorganic acid salt and/or the water-soluble organic acid salt exhibiting substantially no surface activity can be added in a solid form, a powder form, an aqueous solution thereof, or a form dissolved in a polar medium, such as methanol. In this connection, it is noted that as shown in Comparative Examples 3 and 7, when a water-soluble inorganic acid salt and/or a water-soluble organic acid salt exhibiting substantially no surface activity is added to the aqueous dispersion of the particles beforehand, the particles are disadvantageously likely to be aggregated.

When an aqueous dispersion of metallic particles and/or metal compound particles contains a surfactant as a dispersion stabilizer, the surfactant contained in the aqueous dispersion serves also as a part or all of the surfactant which is necessarily present at the time of contacting the aqueous dispersion with the water-immiscible, non-aqueous liquid. Therefore, when the amount of the surfactant is sufficient to emulsify the mixture of the aqueous dispersion and the water-immiscible, non-aqueous liquid, it is no longer necessary to add a surfactant at the time of contacting the aqueous dispersion with the water-immiscible, non-aqueous liquid. However, when the amount of the surfactant contained in the aqueous dispersion is less than 0.01% by weight, based on the weight of water of the aqueous dispersion, it is preferred that when the aqueous dispersion is contacted with the non-aqueous liquid, the surfactant be added to the contacting system in an amount such that the total amount of the surfactant becomes 0.01% to 5% by weight, preferably 0.05 to 0.5% by weight, based on the weight of water of the aqueous dispersion.

In the method of the present invention, by using a water-immiscible, non-aqueous liquid in an amount smaller than the amount of an aqueous dispersion of metallic particles and/or metal compound particles, there can be obtained a non-aqueous dispersion of metallic particles and/or metal compound particles having a higher particle concentration than that of the aqueous dispersion. The amount of the non-aqueous liquid to be used can be determined according to the desired particle concentration of the non-aqueous dispersion, which is usually 1.5 to 15 times a particle concentration of the aqueous dispersion.

As mentioned above, in the method of the present invention, the aqueous dispersion of metallic particles and/or metal compound particles is contacted with the water-immiscible, non-aqueous liquid under the above-mentioned conditions to thereby cause the particles to be migrated from the aqueous dispersion into the non-aqueous liquid, obtaining a two-phase mixture comprised of a non-aqueous dispersion phase having the particles dispersed therein and an aqueous phase substantially free of the particles and then, the non-aqueous dispersion is isolated from the two-phase mixture. A further mode of the method of the present invention consists in repeating the same procedure as mentioned above, except that the obtained non-aqueous dispersion having the particles dispersed therein is used in place of a water-immiscible, non-aqueous liquid, thereby obtaining a non-aqueous dispersion of metallic particles and/or metal compound particles having a particle concentration which is higher than that of the contacting non-aqueous dispersion having the particles already dispersed therein. In this way, there can be obtained successively concentrated non-aqueous dispersions. The concentration of the final non-aqueous dispersion can have a particle concentration which is 1.5 to 15 times the particle concentration of the aqueous dispersion. In this mode, the particles contained in the non-aqueous dispersion are the same as or different from the particles of the aqueous dispersion to be contacted with the non-aqueous dispersion. Thus, there can be obtained a non-aqueous dispersion of metallic particles and/or metal compound particles corresponding to the particles of the aqueous dispersion and to the particles of the contacting non-aqueous liquid having the particles already dispersed therein.

The size of the particles dispersed in the non-aqueous dispersion obtained according to the method of the present invention is substantially the same as the size of the particles in the aqueous dispersion, and the particles are uniformly dispersed in the obtained non-aqueous dispersion. The particle concentration of the obtained non-aqueous dispersion is in the range of from 0.05 to 500 mmol/liter in terms of metal atoms.

In the present invention, as mentioned above, it is noted that when the water-immiscible, non-aqueous dispersion of metallic particles and/or metal compound particles and the aqueous phase are present in two separate phases, all or most of additives, such as a polymer, a reducing agent, a boride-forming agent, a sulfide-forming agent, a hydroxide-forming agent and reaction products thereof which are to be partitioned in the aqueous phase, are, in many cases, present in a dissolved state in the aqueous phase or present in an aggregated form in a phase boundary between the non-aqueous liquid phase and the aqueous phase. This facilitates separation of such additives from the non-aqueous liquid phase.

PREFERRED EMBODIMENT OF THE INVENTION

The present invention will now be described in more detail with reference to the following Examples and Comparative Examples, which should not be construed as limiting the scope of the present invention.

In the following Examples, the particle concentration of a dispersion of metallic particles and/or metal compound particles is measured by the following method.

(1) In the case of a blackish brown dispersion of metallic particles and/or metal compound particles, which occurs in abundance:

Dispersions of metallic particles and/or metal compound particles having different metallic and/or metal compound particle concentrations are prepared and the dispersions are individually subjected to ultraviolet-visible absorption spectrometry. As a result, it is found that there is a good linear relationship between the metallic and/or metal compound particle concentration of the dispersion and the difference between the absorbances at 500 nm and 700 nm. Least squares method is applied to the above relationship to thereby prepare a calibration curve. The sample for measurement is subjected to ultraviolet-visible absorption spectrometry, thereby obtaining the difference between absorbances at 500 nm and 700 nm. From the obtained value, the concentration of the metallic particles and/or metal compound particles present in the above-mentioned dispersion is determined, based on the calibration curve.

(2) In the case of a dispersion of colored particles which exhibit characteristic absorptions:
Gold Particles The concentration of gold particles in a dispersion is measured in the same manner as described in case (1) above, except that a calibration curve is prepared utilizing the absorbance at 520 nm which is measured by taking as a base line a tangential line drawn at the lowest portions of both sides of the characteristic absorption band (460 nm–630 nm) of the dispersion of gold particles in the ultraviolet-visible absorption spectrum.
Silver Particles (Including Silver Particles Whose Dispersion State is Stabilized by a Surfactant and a Protective Polymer)

The concentration of silver particles in a dispersion is measured in the same manner as described in case (1) above, except that a calibration curve is prepared utilizing the absorbance at 400 nm which is measured by taking as a base line a tangential line drawn at the lowest portions of both sides of the characteristic absorption band (320 nm–700 nm) of the dispersion of silver particles in the ultraviolet-visible absorption spectrum.

(3) In the case where metal compound particles in a dispersion are dissolved to obtain a solution of metallic ions, and measurement is done with respect to the metallic ion concentration of the solution, thereby determining the metal compound particle concentration of the dispersion.
Magnetite Particles A predetermined aliquot is taken from a magnetite particle dispersion while vigorously stirring. To the sample taken from the magnetite particle dispersion is added a small amount of concentrated hydrochloric acid, thereby decomposing the magnetite particles and converting the dispersion into a solution. 2 ml is taken from the thus obtained aqueous solution of iron ions, and 2 ml of 10% by weight aqueous hydroxylamine hydrogen chloride solution is added thereto. The resultant mixture is allowed to stand still at 60° C. for 1 hour. Quantative analysis of Fe (III) ions is performed by calorimetric analysis using 1,10-phenanthroline, and the iron concentration of the original magnetite particle dispersion is obtained. Magnetite concentration of the magnetite particle dispersion is calculated from the thus obtained iron concentration.

The particle size distribution can be represented by a coefficient of variation (%) which is defined by formula $\sigma/\bar{x}$ wherein $\bar{x}$ is an average particle size and $\sigma$ is a standard deviation. In each of Examples described below, the coefficient of variation is shown. From those values shown in the following Examples, it will be understood that the particles are extremely uniformly dispersed in the non-aqueous dispersion of the present invention.

EXAMPLE 1

6.06 mg (0.0147 mmol) of chloroauric acid tetrahydrate ($HAuCl_4 \cdot 4H_2O$, manufactured and sold by Wako Pure Chemical Industries., Ltd., Japan) is dissolved in 50 ml of distilled water to thereby obtain a solution. The obtained solution is heated under reflux in a 100 ml-flask provided with a reflux condenser. Then, 1 ml of distilled water containing 0.01 g (0.0387 mmol) of trisodium citrate dihydrate ($NaOCOCH_2C(OH)(COONa)-CH_2COONa \cdot 2H_2O$, guaranteed reagent, manufactured and sold by Kanto Chemical Co., Ltd., Japan) dissolved therein is added thereto, thereby obtaining a red, uniform aqueous dispersion of gold particles having a concentration of 0.288 mmol Au/liter. An aliquot of the aqueous dispersion of gold particles is dried on a carbon film to prepare a test solid sample, and the test solid sample is observed through a transmission type electron microscope. As a result, it is found that the dispersion state of gold particles is good and that the average diameter of the gold particles is 14.7 nm, wherein the coefficient of variation is 11.6%. The aqueous dispersion of gold particles is stable and exhibits no change in the dispersion state even after storage for at least 3 months at room temperature.

25 ml of the above-obtained aqueous dispersion of gold particles is added to 25 ml of cyclohexane and then, 0.025 g of sodium oleate ($CH_3(CH_2)_7CH=CH(CH_2)_7$—COONa, extra pure grade reagent, manufactured and sold by Tokyo Kasei Kogyo Co., Ltd., Japan) as a surfactant is added thereto. The resultant mixture is stirred for 4 hours. Prior to the addition of the sodium oleate to the mixture of the cyclohexane and the aqueous gold dispersion, large droplets have been observed in the mixture, and the mixture has been heterogeneous even after stirring. However, after the addition of the sodium oleate, emulsification occurs to thereby render the mixture homogeneous. Thereafter, 2.5 g of sodium chloride is added thereto and stirred.

After the stirring, the mixture is allowed to stand still for 3 hours. The mixture separates into a lower layer of colorless transparent aqueous phase and an upper layer of red cyclohexane phase having gold particles uniformly dispersed therein. Red colored aggregates of the surfactant are observed in a phase boundary between the aqueous phase and the cyclohexane phase. These liquid phases are put into a separating funnel, and the cyclohexane phase having gold particles dispersed therein is separated. The thus separated cyclohexane dispersion has a gold particle concentration of 0.274 mmol Au/liter. An aliquot of the cyclohexane dispersion of gold particles is dried on a carbon film to prepare a test solid sample, and the test solid sample is observed through a transmission type electron microscope. As a result, it is found that the dispersion state of gold particles is good and that the average diameter of the gold particles is 13.6 nm, wherein the coefficient of variation is 10.6%. The gold particle dispersion is stable and exhibits no change in the dispersion state even after storage for at least 3 months at room temperature.

Comparative Example 1

Substantially the same procedure for preparing a non-aqueous dispersion as described in Example 1 is repeated except that sodium oleate is not added. The stirring of the mixture is discontinued and then, the mixture is allowed to stand still for 15 minutes. As a result, the mixture separates into a lower layer of aqueous phase having red gold particles dispersed therein, and an upper layer of colorless transparent cyclohexane phase. Thus, it is observed that no migration of gold particles from the aqueous dispersion to the cyclohexane phase has occurred.

Comparative Example 2

To 25 ml of cyclohexane are successively added 25 ml of the aqueous dispersion of gold particles obtained in Example 1 and 0.025 g of sodium oleate ($CH_3(CH_2)_7CH=CH(CH_2)_7COONa$, extra pure grade reagent, manufactured and sold by Tokyo Kasei Kogyo Co., Ltd. Japan) as a surfactant, and the resultant mixture is stirred for 4 hours. Sodium chloride is not added thereto, and the mixture is allowed to stand still for one hour.

As a result, the aqueous phase is red and the cyclohexane phase is colorless. A cyclohexane dispersion of gold particles is not obtained.

Comparative Example 3

To 25 ml of cyclohexane are successively added 25 ml of the aqueous dispersion of gold particles obtained in Example 1 and 2.5 g of sodium chloride, and the resultant mixture is stirred for 10 minutes. The mixture is allowed to stand still for one hour. As a result, the gold particles aggregate together and precipitate, and the aqueous phase becomes colorless and transparent. Thereafter, 0.025 g of sodium oleate ($CH_3(CH_2)_7CH=CH-(CH_2)_7COONa$, extra pure grade reagent, manufactured and sold by Tokyo Kasei Kogyo Co., Ltd. Japan) as a surfactant is added thereto, and the resultant mixture is mixed while stirring. However, both of the aqueous phase and the cyclohexane phase remain colorless. This shows that no migration of gold particles from the aqueous phase to the cyclohexane phase has occurred.

EXAMPLE 2

To 25 ml of cyclohexane are simultaneously added the aqueous dispersion of gold particles obtained in Example 1, a solution obtained by dissolving 0.025 g of sodium oleate ($CH_3(CH_2)_7CH=CH(CH_2)_7COONa$, extra pure grade reagent, manufactured and sold by Tokyo Kasei Kogyo Co., Ltd. Japan) in 1 ml of water as a surfactant, and 2.5 g of sodium chloride. The resultant mixture is stirred for 10 minutes. The mixture is allowed to stand still for one hour. As a result, the gold particles aggregate together and precipitate in a phase boundary between an aqueous phase and a cyclohexane phase. Thereafter, the two phases are stirred for 10 minutes. The resultant mixture is allowed to stand still for one hour. As a result, the mixture separates into a lower layer of colorless, transparent aqueous phase and an upper layer of purple cyclohexane phase having gold particles uniformly dispersed therein. The two layers are put into a separating funnel, and only the upper layer of cyclohexane phase having the gold particles dispersed therein is separated.

EXAMPLE 3

Substantially the same procedure for preparing a non-aqueous dispersion as in Example 1 is repeated except that 25 ml of n-hexane is used in place of cyclohexane in Example 1, to thereby obtain a mixture. Prior to the addition of the sodium oleate, the mixture has been heterogeneous in which large droplets are observed. However, after the addition of the sodium oleate, emulsification occurs to thereby render the mixture homogeneous. Thereafter, 2.5 g of sodium chloride is added while stirring.

The stirring is discontinued, and the mixture is allowed to stand still for 3 hours. The mixture separates into a lower layer of colorless, transparent aqueous phase and an upper layer of red n-hexane phase having gold particles uniformly dispersed therein. Red colored aggregates of the surfactant are observed in a phase boundary between the aqueous phase and the n-hexane phase. These liquid phases are put into a separating funnel, and the n-hexane phase having gold particles dispersed therein is separated. The thus separated n-hexane dispersion has a gold particle concentration of 0.274 mmol Au/liter. An aliquot of the n-hexane dispersion of gold particles is dried on a carbon film to prepare a test solid sample, and the test solid sample is observed through a transmission type electron microscope. As a result, it is found that the dispersion state of gold particles is good and that the average diameter of the gold particles is 13.5 nm, wherein the coefficient of variation is 11.3%. The gold particle dispersion is stable and exhibits no change in the dispersion state even after storage for at least 3 months at room temperature.

EXAMPLE 4

Substantially the same procedure for preparing a non-aqueous dispersion as in Example 1 is repeated except that 25 ml of carbon tetrachloride is used in place of cyclohexane in Example 1, to thereby obtain a mixture. Prior to the addition of sodium oleate, the mixture has been heterogeneous in which large droplets are observed. However, after the addition of the sodium oleate, emulsification occurs to thereby render the mixture homogeneous. Thereafter, 2.5 g of sodium chloride is added thereto and stirred.

The stirring is discontinued, and the mixture is allowed to stand still for 3 hours. The mixture separates into an upper layer of colorless, transparent aqueous phase and a lower layer of red carbon tetrachloride phase having gold particles uniformly dispersed therein. Red colored aggregates of the surfactant are observed in a phase boundary between the aqueous phase and the carbon tetrachloride phase. These liquid phases are put into a separating funnel, and the carbon tetrachloride phase having gold particles dispersed therein is separated. The thus separated carbon tetrachloride dispersion has a gold particle concentration of 0.274 mmol Au/liter. An aliquot of the carbon tetrachloride dispersion of gold particles is dried on a carbon film to prepare a test solid sample, and the test solid sample is observed through a transmission type electron microscope. As a result, it is found that the dispersion state of the gold particles is good and that the average diameter of the gold particles is 17.2 nm, wherein the coefficient of variation is 16.7%. The gold particle dispersion is stable and exhibits no change in the dispersion state even after storage for at least 3 months at room temperature.

EXAMPLE 5

To 25 ml of chloroform are successively added 25 ml of the aqueous dispersion of gold particles obtained in Example 1 and 0.025 g of trimethylstearylammonium chloride ($[C_{18}H_{37}N(CH_3)_3]_3Cl$, extra pure grade reagent, manufactured and sold by Tokyo Kasei Kogyo Co., Ltd., Japan) as a surfactant, and the resultant mixture is stirred for 4 hours. Prior to the addition of trimethylstearylammonium chloride, the mixture has been heterogeneous in which large droplets are observed. However, after the addition of the trimethylstearylammonium chloride, emulsification occurs to thereby render the mixture homogeneous. Thereafter, 2.5 g of sodium chloride is added while stirring.

The stirring is discontinued, and the mixture is allowed to stand still for 3 hours. As a result, the mixture separates into an upper layer of colorless, transparent aqueous phase and a lower layer of red chloroform phase having gold particles uniformly dispersed therein. Red colored aggregates of the surfactant are observed in a phase boundary between the two phases. These liquid phases are put into a separating funnel, and the chloroform phase having gold particles dispersed therein is separated. The thus separated chloroform dispersion has a gold particle concentration of 0.274 mmol Au/liter. An aliquot of the chloroform dispersion of gold particles is dried on a carbon film to prepare a test solid sample, and the test solid sample is observed through a transmission type electron microscope. As a result, it is found that the dispersion state of gold particles is good and that the average diameter of the gold particles is 17.8 nm, wherein the coefficient of variation is 22.2%. The gold particle dispersion is stable and exhibits no change in the dispersion state even after storage for at least 3 months at room temperature.

EXAMPLE 6

The same procedure for preparing an aqueous dispersion as in Example 1 is repeated to obtain a red, uniform aqueous dispersion of gold particles having a gold particle concentration of 0.288 mmol Au/liter. An aliquot of the thus-obtained aqueous dispersion of gold particles is dried on a carbon film to prepare a test solid sample, and the test solid sample is observed through a transmission type electron microscope. As a result, it is found that the dispersion state of gold particles is good and that the average diameter of the gold particles is 14.0 nm, wherein the coefficient of variation is 10.2%. The gold particle dispersion is stable and exhibits no change in the dispersion state even after storage for at least 3 months at room temperature.

Substantially the same procedure for preparing a non-aqueous dispersion as in Example 1 is repeated except that the amount of a salt to be added is changed.

To 25 ml of cyclohexane are successively added 25 ml of the above-obtained aqueous dispersion of gold particle and 0.025 g of sodium oleate ($CH_3(CH_2)_7CH=CH-(CH_2)_7COONa$, extra pure grade reagent, manufactured and sold by Tokyo Kasei Kogyo Co., Ltd., Japan) as a surfactant, and the resultant mixture is stirred for 4 hours. Prior to the addition of sodium oleate, the mixture has been heterogeneous in which large droplets are observed. However, after the addition of the sodium oleate, emulsification occurs to thereby render the mixture homogeneous. Thereafter, 1.0 g sodium chloride is added while stirring.

The stirring is discontinued, and the mixture is allowed to stand still for 3 hours. The mixture separates into a lower layer of colorless, transparent aqueous phase and an upper layer of red cyclohexane phase having gold particles uniformly dispersed therein. Red colored aggregates of the surfactant are observed in a phase boundary between the aqueous phase and the n-hexane phase. These liquid phases are put into a separating funnel, and the cyclohexane phase having gold particles dispersed therein is separated. The thus separated cyclohexane dispersion has a gold particle concentration of 0.274 mmol Au/liter. An aliquot of the n-hexane dispersion of gold particles is dried on a carbon film to prepare a test solid sample, and the test solid sample is observed through a transmission type electron microscope. As a result, it is found that the dispersion state of gold particles is good and that the average diameter of the gold particles is 13.2 nm, wherein the coefficient of variation is 16.4%. The gold particle dispersion is stable and exhibits no change in the dispersion state even after storage for at least 3 months at room temperature.

EXAMPLE 7

Substantially the same procedure for preparing a non-aqueous dispersion as in Example 6 is repeated except that 25 ml of n-hexane is used in place of cyclohexane in Example 6, to thereby obtain a mixture. Prior to the addition of sodium oleate, the mixture has been heterogeneous in which large droplets are abserved. However, after the addition of the sodium oleate, emulsification occurs to thereby render the mixture homogeneous. Thereafter, 1.0 g of sodium chloride is added while stirring.

The stirring is discontinued, and the mixture is allowed to stand still for 3 hours. The mixture separates into a lower layer of colorless, transparent aqueous phase and an upper layer of red n-hexane phase having gold particles uniformly dispersed therein. Red colored aggregates of the surfactant are observed in a phase boundary between the aqueous phase and the n-hexane phase. These liquid phases are put into a separating funnel, and the n-hexane phase having gold particles dispersed therein is separated. The thus separated n-hexane dispersion has a gold particle concentration of 0.274 mmol Au/liter. An aliquot of the n-hexane dispersion of gold particles is dried on a carbon film to prepare a test solid sample, and the test solid sample is observed through a transmission type electron microscope. As a result, it is found that the dispersion state of gold particles is good and that the average diameter of the gold particles is 14.0 nm, wherein the coefficient of variation is 18.2%. The gold particle dispersion is stable and exhibits no change in the dispersion state even after storage for at least 3 months at room temperature.

EXAMPLE 8

Substantially the same procedure for preparing a non-aqueous dispersion as in Example 6 is repeated except that 25 ml of carbon tetrachloride is used in place of cyclohexane in Example 6, to thereby obtain a mixture. Prior to the addition of sodium oleate, the mixture has been heterogeneous in which large droplets are observed. However, after the addition of the sodium oleate, emulsification occurs to thereby render the mixture homogeneous. Thereafter, 1.0 g of sodium chloride is added while stirring.

The stirring is discontinued, and the mixture is allowed to stand still for 3 hours. The mixture separates into an upper layer of colorless, transparent aqueous phase and a lower layer of red carbon tetrachloride phase having gold particles uniformly dispersed therein. Red colored aggregates of the surfactant are observed in a phase boundary between the aqueous phase and the carbon tetrachloride phase. These liquid phases are put into a separating funnel, and the carbon tetrachloride phase having gold particles dispersed therein is separated. The thus separated carbon tetrachloride dispersion has a gold particle concentration of 0.274 mmol Au/liter. An aliquot of the carbon tetrachloride dispersion of gold particles is dried on a carbon film to prepare a test solid sample, and the test solid sample is observed through a transmission type electron microscope. As a result, it is found that the dispersion state of gold particles is good and that the average diameter of the gold particles is 16.5 nm, wherein the coefficient of variation is 64.5%. The gold particle dispersion is stable and exhibits no change in the dispersion state even after storage for at least 3 months at room temperature.

EXAMPLE 9

To 25 ml of chloroform are successively added 25 ml of the aqueous dispersion of gold particles obtained in Example 6 and 0.025 g of trimethylstearylammonium chloride ($[C_{18}H_{37}N(CH_3)_3]Cl$, extra pure grade reagent, manufactured and sold by Tokyo Kasei Kogyo Co., Ltd., Japan) as a surfactant, and the resultant mixture is stirred for 4 hours. Prior to the addition of the trimethylstearylammoniumm chloride, the mixture has been heterogeneous in which large droplets are observed. However, after the addition of the trimethylstearylammonium chloride, emulsification occurs to thereby render the mixture homogeneous. Thereafter, 1.0 g of sodium chloride is added while stirring.

The stirring is discontinued, and the mixture is allowed to stand still for 3 hours. The mixture separates into an upper layer of colorless, transparent aqueous phase and a lower layer of red chloroform phase having gold particles uniformly dispersed therein. Red colored aggregates of the surfactant are observed in a phase boundary between an aqueous phase and a chloroform phase. These liquid phases are put into a separating funnel, and the chloroform phase having gold particles dispersed therein is separated. The thus separated chloroform dispersion has a gold particle concentration of 0.274 mmol Au/liter. An aliquot of the chloroform dispersion of gold particles is dried on a carbon film to prepare a test solid sample, and the test solid sample is observed through a transmission type electron microscope. As a result, it is found that the dispersion state of gold particles is good and that the average diameter of the gold particles is 13.5 nm, wherein the coefficient of variation is 26.3%. The gold particle dispersion is stable and exhibits no change in the dispersion state even after storage for at least 3 months at room temperature.

EXAMPLE 10

14 g (54.2 mmol) of trisodium citrate dihydrate ($NaOCOCH_2C(OH)(COONa)CH_2COONa.2H_2O$, guaranteed reagent, manufactured and sold by Kanto Chemical Co., Ltd., Japan) and 7.5 g (49.3 mmol) of ferrous sulfate heptahydrate ($FeSO_4.7H_2O$, extra pure grade reagent, manufactured and sold by Kanto Chemical Co., Ltd., Japan) are dissolved in 60 ml of distilled water, to thereby obtain an aqueous solution. To the thus-obtained solution is added a solution obtained by dissolving 2.5 g (14.8 mmol) of silver nitrate ($AgNO_3$, guaranteed reagent, manufactured and sold by Kanto Chemical Co., Ltd., Japan) in 25 ml of distilled water to thereby obtain silver precipitates. The thus obtained precipitates are isolated by centrifugation and then, dispersed in 1000 ml of distilled water, to thereby obtain a brown, uniform aqueous dispersion of silver particles having a silver concentration of 14.8 mmol Ag/liter. An aliquot of the aqueous dispersion of silver particles is dried on a carbon film to prepare a test solid sample, and the test solid sample is observed through a transmission type electron microscope. As a result, it is found that the dispersion state of silver particles is good and that the average diameter of the silver particles is 8.0 nm, wherein the coefficient of variation is 25.4%. The silver particle dispersion is stable and exhibits no change in the dispersion state even after storage for at least 3 months at room temperature.

To 25 ml of cyclohexane are successively added 25 ml of the above-obtained aqueous dispersion of silver particles and 0.025 g of sodium oleate ($CH_3(CH_2)_7CH=CH-(CH_2)_7COONa$, manufactured and sold by Tokyo Kasei Kogyo Co., Ltd., Japan) as a surfactant, and the resultant mixture is stirred for 4 hours. Prior to the addition of sodium oleate, the mixture has been heterogeneous in which large droplets are observed. However, after the addition of the sodium oleate, emulsification occurs to thereby render the mixture homogeneous. Thereafter, 2.5 g of sodium chloride is added while stirring.

The stirring is discontinued, and the mixture is allowed to stand still for 3 hours. The mixture separates into a lower layer of colorless, transparent aqueous phase and an upper layer of brown cyclohexane phase having silver particles uniformly dispersed therein. Brown colored aggregates of the surfactant are observed in a phase boundary between the aqueous phase and the cyclohexane phase. These liquid phases are put into a separating funnel, and the cyclohexane phase having silver particles dispersed therein is separated. The thus separated cyclohexane dispersion has a silver particle concentration of 14.4 mmol Ag/liter. An aliquot of the cyclohexane dispersion of silver particles is dried on a carbon film to prepare a test solid sample, and the test solid sample is observed through a transmission type electron microscope. As a result, it is found that the dispersion state of silver particles is good and that the average diameter of the silver particles is 7.9 nm, wherein the coefficient of variation is 31.8%. The silver particle dispersion is stable and exhibits no change in the dispersion state even after storage for at least 3 months at room temperature.

EXAMPLE 11

Substantially the same procedure for preparing a non-aqueous dispersion as in Example 10 is repeated except that 25 ml of n-hexane is used in place of cyclohexane in Example 10, to thereby obtain a mixture. Prior to the addition of sodium oleate, the mixture has been heterogeneous in which large droplets are observed. However, after the addition of the sodium oleate, emulsification occurs to thereby render the mixture homogeneous. Thereafter, 2.5 g of sodium chloride is added thereto and stirred.

The stirring is discontinued and, the mixture is allowed to stand still for 3 hours. The mixture separates into a lower layer of colorless, transparent aqueous phase and an upper layer of brown n-hexane phase having silver particles uniformly dispersed therein. Brown colored aggregates of the surfactant are observed in a phase boundary between the aqueous phase and the n-hexane phase. These liquid phases are put into a separating funnel, and the n-hexane phase having silver particles dispersed therein is separated. The thus separated n-hexane dispersion has a silver particle concentration of 14.4 mmol Ag/liter. An aliquot of the n-hexane dispersion of silver particles is dried on a carbon film to prepare a test solid sample, and the test solid sample is observed through a transmission type electron microscope. As a result, it is found that the dispersion state of silver particles is good and that the average diameter of the silver particles is 7.9 nm, wherein the coefficient of variation is 30.7%. The silver particle dispersion is stable and exhibits no change in the dispersion state even after storage for at least 3 months at room temperature.

EXAMPLE 12

Substantially the same procedure for preparing a non-aqueous dispersion as in Example 10 is repeated except that 25 ml of benzene is used in place of cyclohexane in Example 10, to thereby obtain a mixture. Prior to the addition of sodium oleate, the mixture has been heterogeneous in which large droplets are observed. However, after the addition of the sodium oleate, emulsification occurs to thereby render the mixture homogeneous. Thereafter, 2.5 g of sodium chloride is added while stirring.

The stirring is discontinued, and the mixture is allowed to stand still for 3 hours. The mixture separates into a lower layer of colorless, transparent aqueous phase and an upper layer of brown benzene phase having silver particles uniformly dispersed therein. Brown colored aggregates of the surfactant are observed in a phase boundary between the aqueous phase and the benzene phase. These liquid phases are put into a separating funnel, and the benzene phase having silver particles dispersed therein is separated. The thus separated benzene dispersion has a silver particle concentration of 14.4 mmol Ag/liter. An aliquot of the benzene dispersion of silver particles is dried on a carbon film to prepare a test solid sample, and the test solid sample is observed through a transmission type electron microscope. As a result, it is found that the dispersion state of silver particles is good and that the average diameter of the silver particles is 10.4 nm, wherein the coefficient of variation is 33.9%. The silver particle dispersion is stable and exhibits no change in the dispersion state even after storage for at least 3 months at room temperature.

EXAMPLE 13

3.00 g (11.1 mmol) of ferric chloride hexahydrate ($FeCl_3.6H_2O$, guaranteed reagent, manufactured and sold by Kanto Chemical Co., Ltd., Japan) and 1.54 g (5.53 mmol) of ferrous sulfate heptahydrate ($FeSO_4.7H_2O$, extra pure grade reagent, manufactured and sold by Kanto Chemical Co., Ltd., Japan) are dissolved in 150 ml of distilled water to obtain an aqueous solution, and to the obtained solution is added a solution obtained by dissolving 2.5 g of sodium hydroxide in 50 ml of distilled water. The resultant mixture is heated under reflux to thereby obtain an aqueous dispersion of magnetite particles [$Fe_3O_4$, Fe(II)Fe(III) oxide]. Thereafter, the thus obtained aqueous dispersion is washed with distilled water for 5 times by decantation and then, subjected to dialysis with water for 3 days. The resultant residue is dissolved in 200 ml of distilled water again wherein pH thereof is adjusted to 5, to thereby obtain a black, uniform aqueous dispersion of magnetite particles having a magnetite particle concentration of 82.5 mmol $Fe_3O_4$/liter. An aliquot of the thus obtained aqueous dispersion of magnetite particles is dried on a carbon film to prepare a test solid sample, and the test solid sample is observed through a transmission type electron microscope. As a result, it is found that the dispersion state of magnetite particles is good and that the average diameter of the magnetite particles is 10.3 nm, wherein the coefficient of variation is 26.0%. The magnetite particle dispersion is stable and exhibit no change in the dispersion state even after storage for at least 3 months at room temperature.

To 25 ml of cyclohexane are successively added 25 ml of the above-obtained aqueous dispersion of magnetite particles and 0.025 g of sodium oleate ($CH_3(CH_2)_7CH=CH(CH_2)_7COONa$, manufactured and sold by Tokyo Kasei Kogyo Co., Ltd., Japan) as a surfactant, and the resultant mixture is violently shaked for 30 minutes. Prior to the addition of sodium oleate, the mixture has been heterogeneous in which large droplets are observed. However, after the addition of the sodium oleate, emulsification occurs to thereby render the mixture homogeneous. Thereafter, 2.5 g of sodium chloride is added while stirring.

The shaking is discontinued, and the mixture is allowed to stand still for 3 hours. The mixture separates into a lower layer of colorless transparent aqueous phase and an upper layer of black cyclohexane phase having magnetite particles uniformly dispersed therein. Black colored aggregates of the surfactant are observed in a phase boundary between the aqueous phase and the cyclohexane phase. These liquid phases are put into a separating funnel, and the cyclohexane phase having magnetite particles dispersed therein is separated. The thus separated cyclohexane dispersion has a magnetite particle concentration of 78.4 mmol $Fe_3O_4$/liter. An aliquot of the cyclohexane dispersion of magnetite particles is dried on a carbon film to prepare a test solid sample, and the test solid sample is observed through a transmission type electron microscope. As a result, it is found that the dispersion state of magnetite particles is good and that the average diameter of the magnetite particles is 10.0 nm, wherein the coefficient of variation is 30.3%. The magnetite particle dispersion is stable and exhibits no change in the dispersion state even after storage for at least 3 months at room temperature.

EXAMPLE 14

13.07 mg (0.05 mmol) of ruthenium chloride trihydrate ($RuCl_3.3H_2O$, manufactured and sold by Kanto Chemical Co., Ltd., Japan) is dissolved in 95 ml of distilled water to thereby obtain an aqueous solution. To the thus-obtained aqueous solution is added a solution of 7.57 mg (0.2 mmol) of sodium borohydride ($NaBH_4$, manufactured and sold by Nacalai Tesque, Japan) in 5 ml of distilled water to thereby obtain a black, uniform aqueous dispersion of ruthenium particles having a particle concentration of 0.5 mmol Ru/liter. An aliquot of the thus-obtained aqueous dispersion of ruthenium particles is dried on a carbon film to prepare a test solid sample, and the test solid sample is observed through a transmission type electron microscope. As a result, it is found that the dispersion state of the ruthenium particles is good and that the average diameter of the ruthenium particles is 5.1 nm, wherein the coefficient of variation is 30.3%. The aqueous dispersion of ruthenium particles is stable and exhibits no change in the dispersion state even after storage for at least 3 months at room temperature.

To 25 ml of cyclohexane are successively added 25 ml of the above-obtained aqueous dispersion of ruthenium particles and 0.025 g of sodium oleate ($CH_3(CH_2)_7CH=CH(CH_2)_7COONa$, extra pure grade reagent, manufactured and sold by Tokyo Kasei Kogyo Co., Ltd., Japan) as a surfactant, and the resultant mixture is stirred for 4 hours. Prior to the addition of sodium oleate, the mixture has been heterogeneous in which large droplets are observed. However, after the addition of the sodium oleate, emulsification occurs to thereby render the mixture homogeneous. Thereafter, 2.5 g of sodium chloride is added while stirring.

The stirring is discontinued, and the mixture is allowed to stand still for 3 hours. The mixture separates into a lower layer of colorless, transparent aqueous phase and an upper layer of black cyclohexane phase having ruthenium particles uniformly dispersed therein. Black colored aggregates of the surfactant are observed in a phase boundary between the aqueous phase and the cyclohexane phase. These liquid phases are put into a separating funnel, and the cyclohexane phase having ruthenium particles dispersed therein is separated. The thus separated cyclohexane dispersion has a ruthenium particle concentration of 0.475 mmol Ru/liter. An aliquot of the cyclohexane dispersion of ruthenium particles is dried on a carbon film to prepare a test solid sample, and the test solid sample is observed through a transmission type electron microscope. As a result, it is found that the dispersion state of ruthenium particles is good and that the average diameter of the ruthenium particles is 5.7 nm, wherein the coefficient of variation is 23.4%. The ruthenium particle dispersion is stable and exhibits no change in the dispersion state even after storage for at least 3 months at room temperature.

EXAMPLE 15

The same procedure for preparing an aqueous dispersion as in Example 14 is repeated to thereby obtain a black, uniform aqueous dispersion of ruthenium particles having a particle concentration of 0.5 mmol Ru/liter. An aliquot of the aqueous dispersion of ruthenium particles is dried on a carbon film to prepare a test solid sample, and the test solid sample is observed through a transmission type electron microscope. As a result, it is found that the dispersion state of ruthenium particles is good and that the average diameter of the ruthenium particles is 4.2 nm, wherein the coefficient of variation is 30.3%. The ruthenium particle dispersion is stable and exhibits no change in the dispersion state even after storage for at least 3 months at room temperature.

Substantially the same procedure as in Example 14 is repeated except that a salt to be added is changed.

To 25 ml of cyclohexane are successively added 25 ml of the above-obtained aqueous dispersion of ruthenium particles and 0.025 g of sodium oleate ($CH_3(CH_2)_7CH=CH(CH_2)_7COONa$, extra pure grade reagent, manufactured and sold by Tokyo Kasei Kogyo Co., Ltd., Japan) as a surfactant, and the resultant mixture is stirred for 4 hours. Prior to the addition of sodium oleate, the mixture has been heterogeneous in which large droplets are observed. However, after the addition of the sodium oleate, emulsification occurs to thereby render the mixture homogeneous. Thereafter, 0.35 g of magnesium chloride is dissolved in 3 ml of water and, the resultant solution is added to the mixture while stirring.

The stirring is discontinued, and the mixture is allowed to stand still for 3 hours. The mixture separates into a lower layer of colorless, transparent aqueous phase and an upper layer of black cyclohexane phase having ruthenium particles uniformly dispersed therein. Black colored aggregates of the surfactant are observed in a phase boundary between the aqueous phase and the cyclohexane phase. These liquid phases are put into a separating funnel, and the cyclohexane phase having ruthenium particles dispersed therein is separated. The thus separated cyclohexane dispersion has a ruthenium particle concentration of 0.475 mmol Ru/liter. An aliquot of the cyclohexane dispersion of ruthenium particles is dried on a carbon film to prepare a test solid sample, and the test solid sample is observed through a transmission type electron microscope. As a result, it is found that the dispersion state of the ruthenium particles is good and that the average diameter of the ruthenium particles is 4.6 nm, wherein the coefficient of variation is 25.6%. The ruthenium particle dispersion is stable and exhibits no change in the dispersion state even after storage for at least 3 months at room temperature.

EXAMPLE 16

Substantially the same procedure for preparing a non-aqueous dispersion as in Example 15 is repeated except that 25 ml of chloroform is used in place of cyclohexane in Example 15, to thereby obtain a mixture. Prior to the addition of sodium oleate, the mixture has been heterogeneous in which large droplets are observed. However, after the addition of the sodium oleate, emulsification occurs to thereby render the mixture homogeneous. Thereafter, 0.35 g of magnesium chloride is dissolved in 3 ml of water, and the resultant solution is added to the mixture while stirring.

The stirring is discontinued, and the mixture is allowed to stand still for 3 hours. The mixture separates into an upper layer of colorless, transparent aqueous phase and a lower layer of black chloroform phase having ruthenium particles uniformly dispersed therein. Black colored aggregates of the surfactant are observed in a phase boundary between the aqueous phase and the chloroform phase. These liquid phases are put into a separating funnel, and the chloroform phase having ruthenium particles dispersed therein is separated. The thus separated chloroform dispersion has a ruthenium particle concentration of 0.475 mmol Ru/liter. An aliquot of the chloroform dispersion of ruthenium particles is dried on a carbon film to prepare a test solid sample, and the test solid sample is observed through a transmission type electron microscope. As a result, it is found that the dispersion state of ruthenium particles is good and that the average diameter of the ruthenium particles is 4.8 nm, wherein the coefficient of variation is 19.6%. The ruthenium particle dispersion is stable and exhibits no change in the dispersion state even after storage for at least 3 months at room temperature.

EXAMPLE 17

8.865 mg (0.05 mmol) of palladium chloride ($PdCl_2$, manufactured and sold by Kojima Chemical Co., Ltd., Japan) and 11.7 mg (0.2 mmol) of sodium chloride (NaCl, guaranteed reagent, manufactured and sold by Kanto Chemical Co., Ltd., Japan) are dissolved in 95 ml of distilled water to obtain an aqueous solution. To the thus-obtained aqueous solution is added a solution obtained by dissolving 7.75 mg (0.2 mmol) of sodium borohydride ($NaBH_4$, manufactured and sold by Nacalai Tesque, Japan) in 5 ml of distilled water, to thereby obtain a black, uniform aqueous dispersion of palladium particles having a particle concentration of 0.5 mmol Pd/liter. An aliquot of the aqueous dispersion of palladium particles is dried on a carbon film to prepare a test solid sample, and the test solid sample is observed through a transmission type electron microscope. As a result, it is found that the dispersion state of palladium particles is good and that the average diameter of the palladium particles is 5.7 nm, wherein the coefficient of variation is 18.2%. The palladium particle dispersion is stable and exhibits no change in the dispersion state even after storage for at least 3 months at room temperature.

To 25 ml of cyclohexane are successively added 25 ml of the above-obtained aqueous dispersion of palladium particles and 0.025 g of sodium oleate ($CH_3(CH_2)_7$—CH=CH $(CH_2)_7COONa$, extra pure grade reagent, manufactured and sold by Tokyo Kasei Kogyo Co., Ltd., Japan) as a surfactant, and the resultant mixture is stirred for 4 hours. Prior to the addition of the sodium oleate, the mixture has been heterogeneous in which large droplets are observed. However, after the addition of the sodium oleate, emulsification occurs to thereby render the mixture homogeneous. Thereafter, 0.35 g of magnesium chloride is dissolved in 3 ml of water, and the resultant solution is added to the mixture while stirring.

The stirring is discontinued, and the mixture is allowed to stand still for 3 hours. The mixture separates into a lower layer of colorless, transparent aqueous phase and an upper layer of black cyclohexane phase having palladium particles uniformly dispersed therein. Black colored aggregates of the surfactant are observed in a phase boundary between the aqueous phase and the cyclohexane phase. These liquid phases are put into a separating funnel, and the cyclohexane phase having palladium particles dispersed therein is separated. The thus separated cyclohexane dispersion has a palladium particle concentration of 0.475 mmol Pd/liter. An aliquot of the cyclohexane dispersion of palladium particles is dried on a carbon film to prepare a test solid sample, and the test solid sample is observed through a transmission type electron microscope. As a result, it is found that the dispersion state of palladium particles is good and that the average diameter of the palladium particles is 5.5 nm, wherein the coefficient of variation is 16.8%. The palladium particle dispersion is stable and exhibits no change in the dispersion state even after storage for at least 3 months at room temperature.

EXAMPLE 18

Substantially the same procedure as in Example 17 is repeated except that 25 ml of chloroform is used in place of cyclohexane in Example 17, to obtain a mixture. Prior to the addition of sodium oleate, the mixture has been heterogeneous in which large droplets are observed. However, after the addition of the sodium oleate, emulsification occurs to thereby render the mixture homogeneous. Thereafter, 0.35 g of magnesium chloride is dissolved in 3 ml of water, and the resultant solution is added to the mixture.

The stirring is discontinued, and the mixture is allowed to stand still for 3 hours. The mixture separates into an upper layer of colorless, transparent aqueous phase and a lower layer of black chloroform phase having palladium particles uniformly dispersed therein. Black colored aggregates of the surfactant are observed in a phase boundary between the aqueous phase and the chloroform phase. These liquid phases are put into a separating funnel, and the chloroform phase having palladium particles dispersed therein is separated. The thus separated chloroform dispersion has a palladium particle concentration of 0.475 mmol Pd/liter. An aliquot of the chloroform dispersion of palladium particles is dried on a carbon film to prepare a test solid sample, and the test solid sample is observed through a transmission type electron microscope. As a result, it is found that the dispersion state of palladium particles is good and that the average diameter of the palladium particles is 5.5 nm, wherein the coefficient of variation is 20.4%. The palladium particle dispersion is stable and exhibits no change in the dispersion state even after storage for at least 3 months at room temperature.

EXAMPLE 19

Substantially the same procedure for preparing a non-aqueous dispersion as in Example 17 is repeated except that 0.025 g of trimethylstearylammonium chloride ($[C_{18}H_{37}N(CH_3)_3]Cl$, extra pure grade reagent, manufactured and sold by Tokyo Kasei Kogyo Co., Ltd., Japan) as a surfactant is used in place of sodium oleate in Example 18, to obtain a mixture. Prior to the addition of the trimethylstearylammonium chloride, the mixture has been heterogeneous in which large droplets are observed. However, after the addition of the surfactant, emulsification occurs to thereby render the mixture homogeneous. Thereafter, 0.35 g of magnesium chloride is dissolved in 3 ml of water, and the resultant solution is added to the mixture while stirring.

The stirring is discontinued, and the mixture is allowed to stand still for 3 hours. The mixture separates into an upper layer of colorless, transparent aqueous phase and a lower layer of black chloroform phase having palladium particles uniformly dispersed therein. Black colored aggregates of the surfactant are observed in a phase boundary between the aqueous phase and the chloroform phase. These liquid phases are put into a separating funnel, and the chloroform phase having palladium particles dispersed therein is separated. The thus separated chloroform dispersion has a palladium particle concentration of 0.475 mmol Pd/liter. An aliquot of the chloroform dispersion of palladium particles is dried on a carbon film to prepare a test solid sample, and the test solid sample is observed through a transmission type electron microscope. As a result, it is found that the dispersion state of palladium particles is good and that the average diameter of the palladium particles is 6.0 nm, wherein the coefficient of variation is 17.7%. The palladium particle dispersion is stable and exhibits no change in the dispersion state even after storage for at least 3 months at room temperature.

EXAMPLE 20

8.50 mg (0.05 mmol) of silver nitrate ($AgNO_3$, guaranteed reagent, manufactured and sold by Kanto Chemical Co., Ltd., Japan) and 10 mg of sodium oleate ($CH_3(CH_2)_7CH=CH(CH_2)_7COONa$, manufactured and sold by Tokyo Kasei Kogyo Co., Ltd., Japan) as a surfactant are dissolved in 94 ml of distilled water and 1 ml of distilled water, respectively. The two resultant solutions are put into an eggplant-type 100 ml-flask, followed by stirring at room temperature. Further, to the resultant mixture is added a solution obtained by dissolving 7.57 mg (0.2 mmol) of sodium borohydride ($NaBH_4$, manufactured and sold by Nacalai Tesque, Japan) in 5 ml of distilled water, to thereby obtain a yellow, uniform aqueous dispersion of silver particles having a particle concentration of 0.5 mmol Ag/liter. The dispersion state of silver particles is stabilized in the presence of the surfactant. An aliquot of the aqueous dispersion of silver particles is dried on a carbon film to prepare a test solid sample, and the test solid sample is observed through a transmission type electron microscope. As a result, it is found that the dispersion state of silver particles is good and that the average diameter of the silver particles is 5.3 nm, wherein the coefficient of variation is 60.1%. The silver particle dispersion is stable and exhibits no change in the dispersion state even after storage for at least 3 months at room temperature.

To 25 ml of cyclohexane is added 25 ml of the above-obtained aqueous dispersion of silver particles, in which the dispersion state of the particles is stabilized using the surfactant, and the resultant mixture is stirred for 4 hours. Thereafter, 2.5 g of sodium chloride is added thereto.

The stirring is discontinued, and the mixture is allowed to stand still for 3 hours. The mixture separates into a lower layer of colorless, transparent aqueous phase and an upper layer of yellow cyclohexane phase having silver particles uniformly dispersed therein. Yellow colored aggregates of the surfactant are observed in a phase boundary between the aqueous phase and the cyclohexane phase. These liquid phases are put into a separating funnel, and the cyclohexane phase having silver particles dispersed therein is separated. The thus separated cyclohexane dispersion has a silver particle concentration of 0.475 mmol Ag/liter. An aliquot of the cyclohexane dispersion of silver particles is dried on a carbon film to prepare a test solid sample, and the test solid sample is observed through a transmission type electron microscope. As a result, it is found that the dispersion state of silver particles is good and that the average diameter of the silver particles is 3.8 nm, wherein the coefficient of variation is 45.5%. The silver particle dispersion is stable and exhibits no change in the dispersion state even after storage for at least 3 months at room temperature.

Comparative Example 4

25 ml of cyclohexane and 25 ml of the aqueous dispersion of silver particles as obtained in Example 20, in which the dispersion state of the particles is stabilized using the surfactant, are mixed, and the resultant mixture is stirred for 4 hours. Thereafter, the mixture is allowed to stand still for about one hour without adding sodium chloride.

As a result, the aqueous phase is yellow and the cyclohexane phase is colorless. A cyclohexane dispersion having silver particles dispersed therein cannot be obtained.

EXAMPLE 21

25 ml of cyclohexane, 25 ml of the aqueous dispersion of silver particles as obtained in Example 20, in which the dispersion state of the particles is stabilized using the surfactant, and 2.5 g of sodium chloride are added simultaneously and then, the resultant mixture is stirred for 10 minutes. The mixture is allowed to stand still for one hour. As a result, the silver particles aggregate together and precipitate in a phase boundary between the aqueous phase and the cyclohexane phase. Thereafter, the mixture is stirred for 10 minutes and then, allowed to stand still for one hour. As a result, it separates into a lower layer of colorless, transparent aqueous phase and an upper layer of yellow cyclohexane phase having silver particles uniformly dispersed therein. These liquid phases are put into a separating funnel, and the upper layer of cyclohexane phase having silver particles dispersed therein is separated. The dispersion is stable for one week.

EXAMPLE 22

Substantially the same procedure for preparing a non-aqueous dispersion as in Example 20 is repeated except that 25 ml of n-hexane is used in place of cyclohexane in Example 20, to obtain a mixture.

The stirring is discontinued, and the mixture is allowed to stand still for 3 hours. The mixture separates into a lower layer of colorless, transparent aqueous phase and an upper layer of yellow n-hexane phase having silver particles uniformly dispersed therein. Yellow colored aggregates of the surfactant are observed in a phase boundary between the aqueous phase and the n-hexane phase. These liquid phases are put into a separating funnel, and the n-hexane phase having silver particles dispersed therein is separated. The thus separated n-hexane dispersion has a silver particle concentration of 0.475 mmol Ag/liter. An aliquot of the n-hexane dispersion of silver particles is dried on a carbon film to prepare a test solid sample, and the test solid sample is observed through a transmission type electron microscope. As a result, it is found that the dispersion state of silver particles is good and that the average diameter of the silver particles is 3.6 nm, wherein the coefficient of variation is 34.4%. The silver particle dispersion is stable and exhibits no change in the dispersion state even after storage for at least 3 months at room temperature.

EXAMPLE 23

Substantially the same procedure for preparing a non-aqueous dispersion as in Example 20 is repeated except that 25 ml of benzene is used in place of cyclohexane in Example 20, to obtain a mixture.

The stirring is discontinued, and the mixture is allowed to stand still for 3 hours. The mixture separates into a lower layer of colorless, transparent aqueous phase and an upper layer of yellow benzene phase having silver particles uniformly dispersed therein. Yellow colored aggregates of the surfactant are observed in a phase boundary between the aqueous phase and the benzene phase. These liquid phases are put into a separating funnel, and the benzene phase having silver particles dispersed therein is separated. The thus separated benzene dispersion has a silver particle concentration of 0.475 mmol Ag/liter. An aliquot of the benzene dispersion of silver particles is dried on a carbon film to prepare a test solid sample, and the test solid sample is observed through a transmission type electron microscope. As a result, it is found that the dispersion state of silver particles is good and that the average diameter of the silver particles is 3.7 nm, wherein the coefficient of variation is 33.2%. The silver particle dispersion is stable and exhibits no change in the dispersion state even after storage for at least 3 months at room temperature.

EXAMPLE 24

13.2 mg (0.05 mmol) of rhodium (III) chloride trihydrate ($RhCl_3 \cdot 3H_2O$, guaranteed reagent, manufactured and sold by Nippon Engelhard, Co., Ltd., Japan) and 10 mg of sodium dodecylbenzenesulfonate ($C_{12}H_{25}$—$C_6H_4SO_3Na$, extra pure grade reagent, manufactured and sold by Tokyo Kasei Kogyo Co., Ltd., Japan) as a surfactant are dissolved in 94 ml of distilled water and 1 ml of distilled water, respectively. The resultant two solutions are put into an eggplant-type 100 ml-flask, followed by stirring at room temperature. Further, to the resultant mixture is added a solution obtained by dissolving 7.57 mg (0.2 mmol) of sodium borohydride ($NaBH_4$, manufactured and sold by Nacalai Tesque, Japan) in 5 ml of distilled water, to thereby obtain a brown, uniform aqueous dispersion of rhodium particles having a particle concentration of 0.5 mmol Rh/liter. The obtained dispersion is stabilized in the presence of the surfactant. An aliquot of the aqueous dispersion of rhodium particles is dried on a carbon film to prepare a test solid sample, and the test solid sample is observed through a transmission type electron microscope. As a result, it is found that the dispersion state of rhodium particles is good and that the average diameter of the rhodium particles is 4.5 nm, wherein the coefficient of variation is 45.0%. The rhodium particle dispersion is stable and exhibits no change in the dispersion state even after storage for at least 3 months at room temperature.

To 25 ml of chloroform is added 25 ml of the above-obtained aqueous dispersion of rhodium particles, in which the dispersion of the particles has been stabilized by the surfactant, and the resultant mixture is stirred for 4 hours. Thereafter, 2.5 g of sodium chloride is added while stirring.

The stirring is discontinued, and the mixture is allowed to stand still for 3 hours. The mixture separates into an upper layer of colorless, transparent aqueous phase and a lower layer of brown chloroform phase having rhodium particles uniformly dispersed therein. Brown colored aggregates of the surfactant are observed in a phase boundary between the aqueous phase and the chloroform phase. These liquid phases are put into a separating funnel, and the chloroform phase having rhodium particles dispersed therein is separated. The thus separated chloroform dispersion has a rhodium particle concentration of 0.475 mmol Rh/liter. An aliquot of the chloroform dispersion of rhodium particles is dried on a carbon film to prepare a test solid sample, and the test solid sample is observed through a transmission type electron microscope. As a result, it is found that the dispersion state of rhodium particles is good and that the average diameter of the rhodium particles is 3.6 nm, wherein the coefficient of variation is 31.4%. The rhodium particle dispersion is stable and exhibits no change in the dispersion state even after storage for at least 3 months at room temperature.

EXAMPLE 25

13.1 mg (0.05 mmol) of ruthenium (III) chloride trihydrate ($RuCl_3 \cdot 3H_2O$, manufactured and sold by Kanto Kagaku Co., Ltd.) and 10 mg of sodium oleate ($CH_3(CH_2)_7CH=CH(CH_2)_7COONa$, extra pure grade reagent, manufactured and sold by Tokyo Kasei Co., Ltd.) as a surfactant are dissolved in 94 ml of distilled water and 1 ml of distilled water, respectively. The resultant two solutions are put into an eggplant-type 100 ml-flask, and the mixture is stirred at room temperature. Separately, 7.57 mg (0.2 mmol) of sodium borohydride ($NaBH_4$, manufactured and sold by Nacalai Tesque Co., Ltd.) is dissolved in 5 ml of distilled water to thereby obtain a solution. The obtained solution is added to the above-obtained mixture, thereby obtaining a black, uniform aqueous dispersion of ruthenium particles having a ruthenium concentration of 0.5 mmol Ru/liter, in which the dispersion of the particles has been stabilized by the surfactant.

An aliquot of the aqueous dispersion of ruthenium particles is dried on a carbon film to prepare a test solid sample, and the test solid sample is observed through a transmission type electron microscope. As a result, it is found that the dispersion state of the particles is good and that the average diameter of the ruthenium particles is 5.6 nm, wherein the coefficient of variation is 36.7%. The ruthenium particle dispersion is stable and exhibits no change in the dispersion state even after storage for at least 3 months at room temperature.

To 25 ml of chloroform is added 25 ml of the above-obtained aqueous dispersion of ruthenium particles, in which the dispersion of the particles has been stabilized by the surfactant, to thereby obtain a mixture. The obtained mixture is stirred for 4 hours. After stirring, 2.5 g of sodium chloride is added to the resultant mixture.

After discontinuing the stirring, the mixture is allowed to stand still for 3 hours. As a result, the mixture separates into an upper layer of colorless transparent aqueous phase and a lower layer of black chloroform phase having ruthenium particles uniformly dispersed therein. Black colored aggregates of the surfactant are observed in a phase boundary between the aqueous phase and the chloroform phase. These liquid phases are put into a separating funnel, and only the upper layer of chloroform phase having ruthenium particles dispersed therein is separated. The thus separated chloroform dispersion has a ruthenium particle concentration of 0.475 mmol Ru/liter. An aliquot of the chloroform dispersion of ruthenium particles is dried on a carbon film to prepare a test solid sample, and the test solid sample is observed through a transmission type electron microscope. As a result, it is found that the dispersion state of ruthenium particles is good and that the average diameter of the ruthenium particles is 5.1 nm, wherein the coefficient of variation is 36.7%. The ruthenium particle dispersion is stable and exhibits no change in the dispersion state even after storage for at least 3 months at room temperature.

EXAMPLE 26

In substantially the same manner as described in Example 25, a black, uniform aqueous dispersion of ruthenium particles having a ruthenium concentration of 0.5 mmol Ru/liter, in which the dispersion of the particles has been stabilized by the surfactant, is obtained. An aliquot of the aqueous dispersion of ruthenium particles is dried on a carbon film to prepare a test solid sample, and the test solid sample is observed through a transmission type electron microscope. As a result, it is found that the dispersion state of ruthenium particles is good and that the average diameter of the ruthenium particles is 2.9 nm, wherein the coefficient of variation is 62.8%. The ruthenium particle dispersion is stable and exhibits no change in the dispersion state even after storage for at least 3 months at room temperature.

Substantially the same procedure for preparing a non-aqueous dispersion as described in Example 25 is repeated except that a salt to be added is changed.

To 25 ml of chloroform is added 25 ml of the above-obtained aqueous dispersion of ruthenium particles, in which the dispersion of the particles has been stabilized by the surfactant, to thereby obtain a mixture. The obtained mixture is stirred for 4 hours. After stirring, a solution obtained by dissolving 0.35 g of magnesium chloride in 3 ml of water is added to the resultant mixture.

After discontinuing the stirring, the mixture is allowed to stand still for 3 hours. As a result, the mixture separates into an upper layer of colorless, transparent aqueous phase and a lower layer of black chloroform phase having ruthenium particles uniformly dispersed therein. Black colored aggregates of the surfactant are observed in a phase boundary between the aqueous phase and the chloroform phase. These liquid phases are put into a separating funnel, and only the lower layer of chloroform phase having ruthenium particles dispersed therein is separated. The thus separated chloroform dispersion has a ruthenium particle concentration of 0.475 mmol Ru/liter. An aliquot of the chloroform dispersion of ruthenium particles is dried on a carbon film to prepare a test solid sample, and the test solid sample is observed through a transmission type electron microscope.

As a result, it is found that the dispersion state of ruthenium particles is good and that the average diameter of the ruthenium particles is 2.1 nm, wherein the coefficient of variation is 75.6%. The ruthenium particle dispersion is stable and exhibits no change in the dispersion state even after storage for at least 3 months at room temperature.

EXAMPLE 27

Substantially the same procedure for preparing a non-aqueous dispersion as described in Example 25 is repeated except that 25 ml of cyclohexane is used in place of chloroform used in Example 25.

The resultant mixture is stirred for 4 hours. Thereafter the mixture is allowed to stand still for 3 hours. As a result, the mixture separates into a lower layer of colorless, transparent aqueous phase and an upper layer of black cyclohexane phase having ruthenium particles uniformly dispersed therein. Black colored aggregates of the surfactant are observed in a phase boundary between the aqueous phase and the cyclohexane phase. These liquid phases are put into a separating funnel, and only the upper layer of cyclohexane phase having ruthenium particles dispersed therein is separated. The thus separated cyclohexane dispersion has a ruthenium particle concentration of 0.475 mmol Ru/liter. An aliquot of the aqueous cyclohexane dispersion of ruthenium particles is dried on a carbon film to prepare a test solid sample, and the test solid sample is observed through a transmission type electron microscope. As a result, it is found that the dispersion state of ruthenium particles is good and that the average diameter of the ruthenium particles is 3.0 nm, wherein the coefficient of variation is 59.5%. The ruthenium particle dispersion is stable and exhibits no change in the dispersion state even after storage for at least 3 months at room temperature.

EXAMPLE 28

Substantially the same procedure for preparing a non-aqueous dispersion as described in Example 25 is repeated except that 25 ml of n-hexane is used in place of chloroform used in Example 25.

The resultant mixture is stirred for 4 hours. After stirring, the mixture is allowed to stand still for 3 hours. As a result, the mixture separates into a lower layer of colorless, transparent aqueous phase and an upper layer of black n-hexane phase having ruthenium particles uniformly dispersed therein. Black colored aggregates of the surfactant are observed in a phase boundary between the aqueous phase and the n-hexane phase. These liquid phases are put into a separating funnel, and only the upper layer of n-hexane phase having ruthenium particles dispersed therein is separated. The thus separated n-hexane dispersion has a ruthenium particle concentration of 0.475 mmol Ru/liter. An aliquot of the n-hexane dispersion of ruthenium particles is dried on a carbon film to prepare a test solid sample, and the test solid sample is observed through a transmission type electron microscope. As a result, it is found that the dispersion state of ruthenium particles is good and that the average diameter of the ruthenium particles is 2.5 nm, wherein the coefficient of variation is 57.1%. The ruthenium particle dispersion is stable and exhibits no change in the dispersion state even after storage for at least 3 months at room temperature.

EXAMPLE 29

Substantially the same procedure for preparing a non-aqueous dispersion as described in Example 25 is repeated except that 25 ml of benzene is used in place of chloroform used in Example 25.

The resultant mixture is stirred for 4 hours. After stirring, the mixture is allowed to stand still for 3 hours. As a result, the mixture separates into a lower layer of colorless, transparent aqueous phase and an upper layer of black benzene phase having ruthenium particles uniformly dispersed therein. Black colored aggregates of the surfactant are observed in a phase boundary between the aqueous phase and the benzene phase. These liquid phases are put into a separating funnel, and only the upper layer of benzene phase having ruthenium particles dispersed therein is separated. The thus separated benzene dispersion has a ruthenium particle concentration of 0.475 mmol Ru/liter. An aliquot of the benzene dispersion of ruthenium particles is dried on a carbon film to prepare a test solid sample, and the test solid sample is observed through a transmission type electron microscope. As a result, it is found that the dispersion state of ruthenium particles is good and that the average diameter of the ruthenium particles is 2.9 nm, wherein the coefficient of variation is 56.4%. The ruthenium particle dispersion is stable and exhibits no change in the dispersion state even after storage for at least 3 months at room temperature.

EXAMPLE 30

8.865 mg (0.05 mmol) of palladium chloride ($PdCl_2$, manufactured and sold by Kojima Kagaku Co., Ltd.) and 0.025 g of trimethylstearylammonium chloride [$C_{18}H_{37}N(CH_3)_3$]Cl, extra pure grade reagent, manufactured and sold by Tokyo Kasei Co., Ltd.) as a surfactant are dissolved in 94 ml of distilled water and 1 ml of distilled water, respectively. The resultant two solutions are put into an eggplant-type 100 ml-flask and the mixture is stirred at room temperature. Separately, 7.75 mg (0.2 mmol) of sodium borohydride ($NaBH_4$, manufactured and sold by Nacalai Tesque Co., Ltd.) is dissolved in 5 ml of distilled water to thereby obtain a solution. The thus obtained solution is added to the above-obtained mixture, to thereby obtain a black, uniform aqueous dispersion of palladium particles having a palladium concentration of 0.5 mmol Pd/liter, in which the dispersion state of the particles is stabilized by the surfactant. An aliquot of the aqueous dispersion of palladium particles is dried on a carbon film to prepare a test solid sample, and the test solid sample is observed through a transmission type electron microscope. As a result, it is found that the dispersion state of palladium particles is good and that the average diameter of the palladium particles is 5.8 nm, wherein the coefficient of variation is 24.0%. The palladium particle dispersion is stable and exhibits no change in the dispersion state even after storage for at least 3 months at room temperature.

To 25 ml of chloroform is added 25 ml of the above-obtained aqueous dispersion of palladium particles, in which the dispersion of the particles has been stabilized by the surfactant, to thereby obtain a mixture. The obtained mixture is stirred for 4 hours. After stirring, a solution obtained by dissolving 0.35 g of magnesium chloride in 3 ml of water is added to the resultant mixture.

After discontinuing the stirring, the mixture is allowed to stand still for 3 hours. As a result, the mixture separates into an upper layer of colorless, transparent aqueous phase and a lower layer of black chloroform phase having palladium particles uniformly dispersed therein. Black colored aggregates of the surfactant are observed in a phase boundary between the aqueous phase and the chloroform phase. These liquid phases are put into a separating funnel, and only the lower layer of chloroform phase having palladium particles dispersed therein is separated. The thus separated chloroform dispersion has a palladium particle concentration of 0.475 mmol Pd/liter. An aliquot of the chloroform dispersion of palladium particles is dried on a carbon film to prepare a test solid sample, and the test solid sample is observed through a transmission type electron microscope. As a result, it is found that the dispersion state of the particles is good and that the average diameter of the palladium particles is 4.8 nm, wherein the coefficient of variation is 20.6%. The palladium particle dispersion is stable and exhibits no change in the dispersion state even after storage for at least 3 months at room temperature.

EXAMPLE 31

23.75 mg (0.1 mmol) of nickel chloride hexahydrate ($NiCl_2.6H_2O$, manufactured and sold by Kanto Kagaku Co., Ltd.) and 20 mg of sodium oleate ($CH_3(CH_2)_7CH=CH(CH_2)_7COONa$, extra pure grade reagent, manufactured and sold by Tokyo Kasei Co., Ltd.) as a surfactant are dissolved in 94 ml of distilled water and 1 ml of distilled water, respectively. The resultant two solutions are put into an eggplant-type 100 ml-flask and the mixture is stirred at room temperature. Separately, 13.6 mg (0.36 mmol) of sodium borohydride ($NaBH_4$, manufactured and sold by Nacalai Tesque Co., Ltd.) is dissolved in 5 ml of distilled water to thereby obtain a solution. The thus obtained solution is added to the above-obtained mixture, to thereby obtain a black, uniform aqueous dispersion of nickel boride particles having a nickel boride particle concentration of 1 mmol NiB/liter, in which the dispersion state of the particles is stabilized by the surfactant. An aliquot of the aqueous dispersion of nickel boride particles is dried on a carbon film to prepare a test solid sample, and the test solid sample is observed through a transmission type electron microscope. As a result, it is found that the dispersion state of nickel boride particles is good and that the average diameter of the nickel boride particles is 9.8 nm, wherein the coefficient of variation is 33.0%. The nickel boride particle dispersion is stable and exhibits no change in the dispersion state even after storage for at least 3 months at room temperature.

To 25 ml of cyclohexane is added 25 ml of the above-obtained aqueous dispersion of nickel boride particles, in which the dispersion of the particles has been stabilized by the surfactant, to thereby obtain a mixture. The obtained mixture is stirred for 4 hours. After stirring, a solution obtained by dissolving 0.35 g of magnesium chloride in 3 ml of water is added to the resultant mixture.

After discontinuing the stirring, the mixture is allowed to stand still for 3 hours. As a result, the mixture separates into a lower layer of colorless, transparent aqueous phase and an upper layer of black cyclohexane phase having nickel boride particles uniformly dispersed therein. Black colored aggregates of the surfactant are observed in a phase boundary between the aqueous phase and the cyclohexane phase. These liquid phases are put into a separating funnel, and only the upper layer of cyclohexane phase having nickel boride particles dispersed therein is separated. The thus separated cyclohexane dispersion has a nickel boride particle concentration of 0.9 mmol NiB/liter. An aliquot of the cyclohexane dispersion of nickel boride particles is dried on a carbon film to prepare a test solid sample, and the test solid sample is observed through a transmission type electron microscope. As a result, it is found that the dispersion state of nickel boride particles is good and that the average diameter of the nickel boride paraticles is 10.2 nm, wherein the coefficient of variation is 39.1%. The nickel boride particle dispersion is stable and exhibits no change in the dispersion state even after storage for at least 3 months at room temperature.

EXAMPLE 32

Substantially the same procedure for preparing a non-aqueous dispersion as described in Example 31 is repeated except that 25 ml of n-hexane is used in place of cyclohexane used in Example 31.

The resultant mixture is stirred for 4 hours. After stirring, the mixture is allowed to stand still for 3 hours. As a result, the mixture separates into a lower layer of colorless, transparent aqueous phase and an upper layer of black n-hexane phase having nickel boride particles uniformly dispersed therein. Black colored aggregates of the surfactant are observed in a phase boundary between the aqueous phase and the n-hexane phase. These liquid phases are put into a separating funnel, and only the upper layer of n-hexane phase having nickel boride particles dispersed therein is separated. The thus separated n-hexane dispersion has a nickel boride particle concentration of 0.9 mmol NiB/liter. An aliquot of the n-hexane dispersion of nickel boride particles is dried on a carbon film to prepare a test solid sample, and the test solid sample is observed through a transmission type electron microscope. As a result, it is found that the dispersion state of nickel boride particles is good and that the average diameter of the nickel boride particles is 12.3 nm, wherein the coefficient of variation is 31.8%. The nickel boride particle dispersion is stable and exhibits no change in the dispersion state even after storage for at least 3 months at room temperature.

EXAMPLE 33

Substantially the same procedure for preparing a non-aqueous dispersion as described in Example 31 is repeated except that 25 ml of benzene is used in place of cyclohexane used in Example 31.

The resultant mixture is stirred for 4 hours. After stirring, the mixture is allowed to stand still for 3 hours. As a result, the mixture separates into a lower layer of colorless, transparent aqueous phase and an upper layer of black benzene phase having nickel boride particles uniformly dispersed therein. Black colored aggregates of the surfactant are observed in a phase boundary between the aqueous phase and the benzene phase. These liquid phases are put into a separating funnel, and only the upper layer of benzene phase having nickel boride particles dispersed therein is separated. The thus separated benzene dispersion has a nickel boride particle concentration of 0.9 mmol NiB/liter. An aliquot of the benzene dispersion of nickel boride particles is dried on a carbon film to prepare a test solid sample, and the test solid sample is observed through a transmission type electron microscope. As a result, it is found that the dispersion state of nickel boride particles is good and that the average diameter of the nickel boride particles is 12.1 nm, wherein the coefficient of variation is 31.3%. The nickel boride particle dispersion is stable and exhibits no change in the dispersion state even after storage for at least 3 months at room temperature.

EXAMPLE 34

2.809 g (20.5 mmol) of metallic barium (Ba, manufactured and sold by Kanto Kagaku Co., Ltd.) is dissolved in 55.54 ml of isopropanol (iso-$C_3H_7OH$, guaranteed reagent, manufactured and sold by Kanto Kagaku Co., Ltd.) to thereby prepare barium isopropoxide. Separately, 9 ml (47.27 mmol) of titanium isopropoxide (Ti(OC$_3$H$_7$)$_4$, manufactured and sold by Kanto Kagaku Co., Ltd.) is mixed with 36 ml (333 mmol) of tert-amylalcohol (tert-C$_5$H$_{11}$OH, guaranteed reagent, manufactured and sold by Kanto Kagaku Co., Ltd.) to thereby obtain a mixture. The thus obtained mixture is heated under reflux for 24 hours, and the mixture is added to 44.46 ml of barium isopropoxide. The resultant mixture is again heated under reflux for 2 hours. Then, hydrolysis is carried out by dropwise adding 2.5 ml of distilled water to the mixture to thereby obtain a hydrolyzate. The obtained hydrolyzate is subjected to evaporation to dryness to thereby obtain white powder of barium titanate.

0.0117 g (0.05 mmol) of barium titanate and 0.1 g of sodium oleate (CH$_3$(CH$_2$)$_7$CH=CH(CH$_2$)$_7$COONa, extra pure grade reagent, manufactured and sold by Tokyo Kasei Kogyo Co., Ltd.) as a surfactant are added to 100 ml of distilled water and the resultant mixture is stirred to thereby obtain an aqueous dispersion of barium titanate particles having a barium titanate particle concentration of 0.5 mmol BaTiO$_3$/liter, in which the dispersion of the particles has been stabilized by the surfactant. It is found that the dispersion state of the barium titanate particles is good. In the obtained aqueous dispersion of barium titanate particles, however, the barium titanate particles precipitate in two days under room temperature. Therefore, an aqueous dispersion of barium titanate particles which has just been prepared is used to cause the particles to be migrated from an aqueous phase to a non-aqueous liquid phase. Further, barium titanate particles which have already precipitated, are again dispersed by stirring.

To 25 ml of cyclohexane is added 25 ml of the above-obtained aqueous dispersion of barium titanate particles, in which the dispersion of the particles has been stabilized by the surfactant, to thereby obtain a mixture. The obtained mixture is stirred for 4 hours. After stirring, a solution obtained by dissolving 0.35 g of magnesium chloride in 3 ml of water is added to the resultant mixture.

After discontinuing the stirring, the mixture is allowed to stand still for 3 hours. As a result, the mixture separates into a lower layer of colorless, transparent aqueous phase and an upper layer of white cyclohexane phase having barium titanate particles uniformly dispersed therein. White colored aggregates of the surfactant are observed in a phase boundary between the aqueous phase and the cyclohexane phase. These liquid phases are put into a separating funnel, and only the upper layer of the cyclohexane phase having barium titanate particles dispersed therein is separated. The thus separated cyclohexane dispersion has a barium titanate particle concentration of 0.475 mmol BaTiO$_3$/liter. It is found that the dispersion state of the particles is good. The barium titanate particle dispersion is stable for one day at room temperature and thereafter barium titanate particles precipitate in the phase boundary. However, when a stirring is given, the barium titanate particles can be dispersed again.

EXAMPLE 35

Substantially the same procedure for preparing a non-aqueous dispersion as described in Example 34 is repeated except that 25 ml of n-hexane is used in place of cyclohexane used in Example 34.

The resultant mixture is stirred for 4 hours. After stirring, the mixture is allowed to stand still for 3 hours. As a result, the mixture separates into a lower layer of colorless, transparent aqueous phase and an upper layer of white n-hexane phase having barium titanate particles uniformly dispersed therein. White colored aggregates of the surfactant are observed in a phase boundary between the aqueous phase and the n-hexane phase. These liquid phases are put into a separating funnel, and only the upper layer of n-hexane phase having barium titanate particles dispersed therein is separated. The thus separated n-hexane dispersion has a barium titanate particle concentration of 0.475 mmol BaTiO$_3$/liter. It is found that the dispersion state of barium titanate particles is good. The obtained barium titanate particle dispersion is stable for one day at room temperature and thereafter barium titanate particles precipitate in the phase boundary. However, when the dispersion is stirred, the barium titanate particles can be dispersed again.

EXAMPLE 36

Substantially the same procedure for preparing a non-aqueous dispresion as described in Example 34 is repeated except that 25 ml of benzene is used in place of cyclohexane used in Example 34.

The resultant mixture is stirred for 4 hours. Thereafter the mixture is allowed to stand still for 3 hours. As a result, the mixture separates into a lower layer of colorless, transparent aqueous phase and an upper layer of white benzene phase having barium titanate particles uniformly dispersed therein. Colored aggregates of the surfactant are observed in a phase boundary between the aqueous phase and the benzene phase. These liquid phases are put into a separating funnel, and only the upper layer of benzene phase having barium titanate particles dispersed therein is separated. The thus separated benzene dispersion has a barium titanate particle concentration of 0.475 mmol BaTiO$_3$/liter. It is found that the dispersion state of the particles is good. The barium titanate particle dispersion is stable for one day at room temperature and thereafter barium titanate particles precipitate in the phase boundary. However, the barium titanate particles can be dispersed again by stirring.

EXAMPLE 37

Substantially the same procedure for preparing a non-aqueous dispersion as described in Example 34 is repeated except that 25 ml of chloroform is used in place of cyclohexane used in Example 34.

The resultant mixture is stirred for 4 hours. Thereafter the mixture is allowed to stand still for 3 hours. As a result, the mixture separates into an upper layer of colorless, transparent aqueous phase and a lower layer of white chloroform phase having barium titanate particles uniformly dispersed therein. These liquid phases are put into a separating funnel, and only the lower layer of chloroform phase having barium titanate particles dispersed therein is separated. The thus separated chloroform dispersion has a barium titanate particle concentration of 0.475 mmol BaTiO$_3$/liter. It is found that the dispersion state of the particles is good. The barium titanate particle dispersion is stable and exhibits no change in the dispersion state even after storage for at least one month at room temperature.

EXAMPLE 38

Substantially the same procedure for preparing a non-aqueous dispersion as described in Example 34 is repeated except that 0.025 g of sodium dodecylbenzenesulfonate (C$_{12}$H$_{25}$C$_6$H$_4$SO$_3$Na, extra pure grade reagent, manufactured and sold by Tokyo Kasei Co., Ltd.) as a surfactant is used in place of sodium oleate used in Example 37.

The resultant mixture is stirred for 4 hours. Thereafter the mixture is allowed to stand still for 3 hours. As a result, the mixture separates into an upper layer of colorless, transparent aqueous phase and a lower layer of white chloroform phase having barium titanate particles uniformly dispersed therein. These liquid phases are put into a separating funnel, and only the lower layer of chloroform phase having barium titanate particles dispersed therein is separated. The thus separated chloroform dispersion has a barium titanate particle concentration of 0.475 mmol $BaTio_3$/liter. It is found that the dispersion state of the particles is good. The barium titanate particle dispersion is stable and exhibits no change even after storage for at least one month at room temperature.

EXAMPLE 39

11.2 mg (0.066 mmol) of silver nitrate ($AgNO_3$, guaranteed reagent, manufactured and sold by Tokyo Kasei Co., Ltd.) and 59.2 mg (0.528 mmol in terms of the molar amount of monomer units, and molar ratio to silver atoms: 8) of poly(N-vinyl-2-pyrrolidone) (average molecular weight of 10,000, manufactured and sold by Kanto Kasei Kogyo Co., Ltd., Japan) as a polymer are dissolved in 60 ml of methanol and 30 ml of methanol, respectively. The resultant two solutions are mixed. The mixture is heated under reflux in an eggplant-type 100 ml-flask provided with a reflux condenser. Then, 10 ml of methanol containing 2.46 mg (0.066 mmol) of sodium hydroxide dissolved therein is added thereto, and the resultant mixture is heated for 10 minutes to thereby obtain 100 ml of a yellow, uniform methanol dispersion of silver particles, in which the dispersion of the particles has been stabilized by the polymer. The obtained dispersion of silver particles is subjected to vacuum drying. The resultant dried product is re-dispersed in 100 ml of distilled water, to thereby obtain an aqueous dispersion of silver particles having a silver particle concentration of 0.66 mmol Ag/liter, in which the dispersion state of the particles is stabilized by the polymer. An aliquot of the aqueous dispersion of silver particles is dried on a carbon film to prepare a test solid sample, and the test solid sample is observed through a transmission type electron microscope. As a result, it is found that the dispersion state of the silver particles is good and that the average diameter of the silver particles is 13.0 nm, wherein the coefficient of variation is 52.4%. The silver particle dispersion is stable and exhibits no change in the dispersion state even after storage for at least 3 months at room temperature.

25 ml of the above-obtained aqueous dispersion of silver particles, in which the dispersion of the particles has been stabilized by the polymer, and 0.025 g of sodium oleate ($CH_3(CH_2)_7CH=CH(CH_2)_7COONa$, extra pure grade reagent, manufactured and sold by Tokyo Kasei Co., Ltd.) as a surfactant are successively added to 25 ml of cyclohexane, and the resultant mixture is stirred for 4 hours. Prior to the addition of the sodium oleate, the mixture has been heterogeneous in which large droplets are observed. However, after the addition of the sodium oleate, emulsification occurs to thereby render the mixture homogeneous. Thereafter, 2.5 g of sodium chloride is added while stirring.

After discontinuing the stirring, the mixture is allowed to stand still for 3 hours. The mixture separates into a lower layer of colorless transparent aqueous phase and an upper layer of yellow cyclohexane phase having silver particles uniformly dispersed therein. Yellow colored aggregates of the surfactant are observed in a phase boundary between the aqueous phase and the cyclohexane phase. These liquid phases are put into a separating funnel, and only the upper layer of the cyclohexane phase having the silver particles dispersed therein is separated. The thus separated cyclohexane dispersion has a silver particle concentration of 0.627 mmol Ag/liter. An aliquot of the cyclohexane dispersion of silver particles is dried on a carbon film to prepare a test solid sample, and the test solid sample is observed through a transmission type electron microscope. As a result, it is found that the dispersion state of silver particles is good and that the average diameter of the silver particles is 8.9 nm, wherein the coefficient of variation is 65.9%. The silver particle dispersion is stable and exhibits no change in the dispersion state even after storage for at least 3 months at room temperature.

Comparative Example 5

Substantially the same procedure as described in Example 39 is repeated except that sodium oleate is not added. Migration of silver particles to the cyclohexane phase is observed. However, the silver particles aggregate soon, so that and silver particles are deposited.

Comparative Example 6

25 ml of the aqueous dispersion of silver particles obtained in Example 39, in which the dispersion of the particles has been stabilized by the polymer, and 0.025 g of sodium oleate ($CH_3(CH_2)_7CH=CH(CH_2)_7COONa$, extra pure grate reagent, manufactured and sold by Tokyo Kasei Co., Ltd.) as a surfactant are successively added to 25 ml of cyclohexane, and the resultant mixture is stirred for 4 hours. After the stirring, the mixture is allowed to stand still for about an hour, without addition of sodium chloride.

As a result, it separates into a lower layer of aqueous phase having yellow silver particles dispersed therein and an upper layer of colorless, transparent cyclohexane phase. Thus, it is observed that no migration of silver particles from the aqueous dispersion to the cyclohexane phase has occurred.

Comparative Example 7

25 ml of the dispersion of silver particles obtained in Example 39, in which the dispersion of the particles has been stabilized by poly(N-vinyl-2-pyrrolidone), and 2.5 g of sodium chloride are added to 25 ml of cyclohexane. As a result, the silver particles aggregate together and precipitate, to thereby produce an upper layer of cyclohexane phase and a lower layer of colorless, transparent aqueous phase containing the silver precipitates. Thereafter, 0.025 g of sodium oleate ($CH_3(CH_2)_7CH=CH(CH_2)_7COONa$, extra pure grade reagent, manufactured and sold by Tokyo Kasei Kogyo Co., Ltd., Japan) is added and mixed while stirring. Despite this, both of the aqueous phase and the cyclohexane phase are colorless. Thus, it is observed that no migration of the silver particles from the aqueous phase to the cyclohexane phase has occurred.

EXAMPLE 40

25 ml of the dispersion of silver particles obtained in Example 39, in which the dispersion of the particles has been stabilized by poly(N-vinyl-2-pyrrolidone), a solution of 0.025 g of sodium oleate ($CH_3(CH_2)_7CH=CH(CH_2)_7COONa$, extra pure grade reagent, manufactured and sold by Tokyo Kasei Kogyo Co., Ltd., Japan) as a surfactant in 1 ml of water and 2.5 g of sodium chloride are simultaneously added to 25 ml of cyclohexane, and stirred for 10 minutes. The mixture is allowed to stand still for an hour. As a result, the silver particles aggregate together and precipitate in a phase boundary between an aqueous phase and a cyclohexane phase. The mixture is stirred for 10, minutes, and allowed to stand still for an hour. As a result, the mixture separates into a lower layer of colorless, transparent aqueous phase and an upper layer of yellow, uniform cyclohexane phase having silver particles dispersed therein. The two-phase mixture is put into a separating funnel, and the upper layer of cyclohexane phase having silver particles dispersed therein is isolated.

EXAMPLE 41

Substantially the same procedure for preparing a non-aqueous dispersion as in Example 39 is repeated except that 25 ml of n-hexane is used in place of cyclohexane. Before the addition of sodium oleate, the mixture has been heterogeneous in which large droplets are observed. However, after the addition of sodium oleate, emulsification occurs to thereby render the mixture homogeneous. Thereafter, 2.5 g of sodium chloride is added while stirring.

The stirring is discontinued, and the mixture is allowed to stand still for 3 hours. As a result, the mixture separates into a lower layer of colorless, transparent aqueous phase and an upper layer of yellow n-hexane phase having silver particles uniformly dispersed therein. Yellow colored aggregates of the surfactant are observed in a phase boundary between the aqueous phase and the n-hexane phase. These liquid phases are put into a separating funnel, and the n-hexane phase having silver particles dispersed therein is separated. The thus separated n-hexane dispersion has a silver particle concentration of 0.627 mmol Ag/liter. An aliquot of the n-hexane dispersion of silver particles is dried on a carbon film to prepare a test solid sample, and the test solid sample is observed through a transmission type electron microscope. As a result, it is found that the dispersion state of the silver particles is good and that the average diameter of the silver particles is 11.3 nm, wherein the coefficient of variation is 50.3%. The silver particle dispersion is stable and exhibits no change in the dispersion state even after storage for at least 3 months at room temperature.

EXAMPLE 42

Substantially the same procedure for preparing a non-aqueous dispersion as in Example 39 is repeated except that 25 ml of benzene is used in place of cyclohexane. Before the addition of sodium oleate, the mixture has been heterogeneous in which large droplets are observed. However, after the addition of sodium oleate, emulsification occurs to thereby render the mixture homogeneous. Thereafter, 2.5 g of sodium chloride is added while stirring.

The stirring is discontinued, and the mixture is allowed to stand still for 3 hours. As a result, the mixture separates into a lower layer of colorless, transparent aqueous phase and an upper layer of yellow benzene phase having silver particles uniformly dispersed therein. Yellow colored aggregates of the surfactant are observed in a phase boundary between the aqueous phase and the benzene phase. These liquid phases are put into a separating funnel, and the benzene phase having silver particles dispersed therein is separated. The thus separated benzene dispersion has a silver particle concentration of 0.627 mmol Ag/liter. An aliquot of the benzene dispersion of silver particles is dried on a carbon film to prepare a test solid sample, and the test solid sample is observed through a transmission type electron microscope. As a result, it is found that the dispersion state of silver particles is good and that the average diameter of the silver particles is 6.6 nm, wherein the coefficient of variation is 65.7%. The silver particle dispersion is stable and exhibits no change in the dispersion state even after storage for at least 3 months at room temperature.

EXAMPLE 43

25 ml of the aqueous dispersion of silver particles obtained in Example 39, in which the dispersion of the particles has been stabilized by the polymer of poly(N-vinyl-2-pyrrolidone), and 0.025 g of trimethylstearylammonium chloride ($[C_{18}H_{37}N(CH_3)_3]Cl$, extra pure grade reagent, manufactured and sold by Tokyo Kasei Kogyo Co., Ltd., Japan) as a surfactant are successively added to 25 ml of chloroform, and stirred for 4 hours. Before the addition of trimethylstearylammonium chloride, the mixture has been heterogeneous in which large droplets are observed. However, after the addition of trimethylstearylammonium chloride, emulsification occurs to thereby render the mixture homogeneous. Thereafter, 2.5 g of sodium chloride is added while stirring.

The stirring is discontinued, and the mixture is allowed to stand still for 3 hours. As a result, the mixture separates into an upper layer of colorless, transparent aqueous phase and a lower layer of yellow chloroform phase having silver particles uniformly dispersed therein. Yellow colored aggregates of the surfactant are observed in a phase boundary between the aqueous phase and the chloroform phase. These liquid phases are put into a separating funnel, and the chloroform phase having silver particles dispersed therein is separated. The thus separated chloroform dispersion has a silver particle concentration of 0.627 mmol Ag/liter. An aliquot of the chloroform dispersion of silver particles is dried on a carbon film to prepare a test solid sample, and the test solid sample is observed through a transmission type electron microscope. As a result, it is found that the dispersion state of silver particles is good and that the average diameter of the silver particles is 5.7 nm, wherein the coefficient of variation is 64.3%. The silver particle dispersion is stable and exhibits no change in the dispersion state even after storage for at least 3 months at room temperature.

EXAMPLE 44

77.9 mg (0.31 mmol) of copper sulfate pentahydrate ($CuS.SO_4.5H_2O$, extra pure grade reagent, manufactured and sold by Kanto Kasei Kogyo Co., Ltd., Japan) and 34.8 mg (0.31 mmol in terms of the molar amount of monomer units, and molar ratio to copper atoms: 1) of poly(N-vinyl-2-pyrrolidone) (average molecular weight of 10,000, manufactured and sold by Kanto Kasei Kogyo Co., Ltd., Japan) are dissolved in 50 ml of water to obtain a solution. An aqueous solution of 77.4 mg (0.31 mmol) of sodium thiosulfate (guaranteed reagent, manufactured and sold by Kanto Kasei Kogyo Co., Ltd., Japan) is added to the above obtained solution, and heated under reflux at 60° C. for 30 minutes. Thus, 100 ml of a brown, uniform aqueous dispersion of copper sulfide particles having a concentration of 3.1 nmol CuS/liter, in which the dispersion has been stabilized by poly(N-vinyl-2-pyrrolidone), is obtained. An aliquot of the aqueous dispersion of copper sulfide particles is dried on a carbon film to prepare a test solid sample, and the test solid sample is observed through a transmission type electron microscope. As a result, it is found that the dispersion state of the copper sulfide particles is good and that the copper sulfide particles consist of primary particles and secondary particles composed of primary particles. The average diameter of the primary particles is 14.5 nm, wherein the coefficient of variation is 13.3%. The average diameter of the secondary particles is 77.6 nm, wherein the coefficient of variation is 17.3%. The aqueous dispersion of copper sulfide particles is stable and exhibits no change in the dispersion state even after storage for at least 3 months at room temperature in a nitrogen atmosphere.

25 ml of the above-obtained aqueous dispersion of copper sulfide particles and 0.025 g of sodium dodecylbenzenesulfonate ($C_{12}H_{25}C_6H_4SO_3Na$, extra pure grade reagent, manufactured and sold by Tokyo Kasei Kogyo Co., Ltd., Japan) as a surfactant are successively added to 25 ml of chloroform, and the resultant mixture is stirred for 4 hours. Prior to the addition of sodium dodecylbenzenesulfonate to the mixture of the chloroform and the aqueous copper sulfide dispersion, large droplets have been observed in the mixture, and the mixture has been heterogeneous even after stirring. However, after the addition of sodium dodecylbenzenesulfonate, the mixture becomes emulsified and homogeneous. Thereafter, a solution obtained by dissolving 0.35 g of magnesium chloride in 3 ml of water is added thereto while stirring.

After the stirring, the mixture is allowed to stand still for 3 hours. The mixture separates into an upper layer of colorless, transparent aqueous phase and a lower layer of brown chloroform phase having copper sulfide particles uniformly dispersed therein. Brown colored aggregates of the surfactant are observed in a phase boundary between the aqueous phase and the chloroform phase. These liquid phases are put into a separating funnel, and the lower layer of chloroform phase having copper sulfide particles dispersed therein is separated. The thus separated chloroform dispersion has a copper sulfide particle concentration of 2.9 mmol Cus/liter. An aliquot of the chloroform dispersion of copper sulfide particles is dried on a carbon film to prepare a test solid sample, and the test solid sample is observed through a transmission type electron microscope. As a result, it is found that the dispersion state of copper sulfide particles is good. The average diameter of primary copper sulfide particles is 14.6 nm, wherein the coefficient of variation is 11.4%. The average diameter of secondary copper sulfide particles is 75.3 nm, wherein the coefficient of variation is 15.4%. The aqueous dispersion of copper sulfide particles is stable and exhibits no change in the dispersion state even after storage for at least 3 months at room temperature.

EXAMPLE 45

62.42 mg (0.25 mmol) of copper sulfate pentahydrate ($CuSO_4 \cdot 5H_2O$, guaranteed reagent, manufactured and sold by Kanto Kasei Kogyo Co., Ltd., Japan) and 1.11 g (10 mmol in terms of the molar amount of monomer units, and molar ratio to copper atoms: 40) of poly(N-vinyl-2-pyrrolidone) (average molecular weight of 10,000, manufactured and sold by Kanto Kasei Kogyo Co., Ltd., Japan) are dissolved in 45 ml of distilled water to obtain a solution. The obtained solution is heated at 80° C. under reflux in a 50 ml-flask provided with a reflux condenser, and cooled to 25 ° C. Then, a solution of 18.92 mg (0.5 mmol) of sodium borohydride ($NaBH_4$, manufactured and sold by Nacalai Tesque, Japan) in 5 ml of distilled water is added, thereby obtaining a black, uniform aqueous dispersion of copper particles having a concentration of 5.0 mmol Cu/liter, the dispersion of which has been stabilized by poly(N-vinyl-2-pyrrolidone), is obtained. An aliquot of the aqueous dispersion of copper particles is dried on a carbon film to prepare a test solid sample, and the test solid sample is observed through a transmission type electron microscope. As a result, it is found that the dispersion state of the copper particles is good and that the average diameter of the copper particles is 5.4 nm, wherein the coefficient of variation is 43.5%. The aqueous dispersion of copper particles is stable and exhibits no change in the dispersion state even after storage for at least 3 months at room temperature in a nitrogen atmosphere.

25 ml of the above-obtained aqueous dispersion of copper particles and 0.025 g of trimethylstearylammonium chloride ($[C_{18}H_{37}N(CH_3)_3]Cl$, extra pure grade reagent, manufactured and sold by Tokyo Kasei Kogyo Co., Ltd., Japan) as a surfactant are successively added to 25 ml of chloroform, and the resultant mixture is stirred for 4 hours. Prior to the addition of trimethylstearylammonium chloride to the mixture of the chloroform and the aqueous copper dispersion, large droplets have been observed in the mixture, and the mixture has been heterogeneous even after stirring. However, after the addition of trimethylstearylammonium chloride, the mixture becomes emulsified and homogeneous. Thereafter, a solution of 0.35 g of magnesium chloride in 3 ml of water is added thereto while stirring.

After discontinuing the stirring, the mixture is allowed to stand still for 3 hours. As a result, it separates into an upper layer of colorless, transparent aqueous phase and a lower layer of black, uniform chloroform phase having copper particles dispersed therein. Black colored aggregates of the surfactant are observed in a phase boundary between the aqueous phase and the chloroform phase. These liquid phases are put into a separating funnel, and the lower layer of chloroform phase having copper particles dispersed therein is separated. The thus separated chloroform dispersion has a copper particle concentration of 4.75 mmol Cu/liter. An aliquot of the chloroform dispersion of copper particles is dried on a carbon film to prepare a test solid sample, and the test solid sample is observed through a transmission type electron microscope. As a result, it is found that the dispersion state of copper particles is good, and the average diameter of copper particles is 8.8 nm, wherein the coefficient of variation is 25.9%. The aqueous dispersion of copper particles is stable and exhibits no change in the dispersion state even after storage for at least 3 months at room temperature.

EXAMPLE 46

Substantially the same procedure for preparing a non-aqueous dispersion as in Example 45 is repeated except that 25 ml of benzene is used in place of chloroform. Before the addition of trimethylstearylammonium chloride, the mixture has been heterogeneous in which large droplets are observed. However, after the addition of trimethylstearylammonium chloride, emulsification occurs to thereby render the mixture homogeneous. Thereafter, a solution of 0.35 g of magnesium chloride in 3 ml of water is added, and stirred for 4 hours. Then, the mixture is allowed to stand still for 3 hours. As a result, the mixture separates into a lower layer of colorless, transparent aqueous phase and an upper layer of black benzene phase having copper particles uniformly dispersed therein. Black colored aggregates of the surfactant are observed in a phase boundary between the aqueous phase and the benzene phase. These liquid phases are put into a separating funnel, and the upper layer benzene phase having copper particles dispersed therein is separated. The thus separated benzene dispersion has a copper particle concentration of 4.75 mmol Cu/liter. An aliquot of the benzene dispersion of copper particles is dried on a carbon film to prepare a test solid sample, and the test solid sample is observed through a transmission type electron microscope. As a result, it is found that the dispersion state of copper particles is good and that the average diameter of the copper particles is 4.8 nm, wherein the coefficient of varia-

EXAMPLE 47

Substantially the same procedure for preparing a non-aqueous dispersion as in Example 46 is repeated except that sodium oleate is used in place of trimethylstearylammonium chloride. Before the addition of sodium oleate, the mixture has been heterogeneous in which large droplets are observed. However, after the addition of sodium oleate, the mixture becomes homogeneous. Thereafter, a solution obtained by dissolving 0.35 g of magnesium chloride in 3 ml of water is added, and stirred for 4 hours. Then, the mixture is allowed to stand still for 3 hours. As a result, the mixture separates into a lower layer of colorless, transparent aqueous phase and an upper layer of black benzene phase having copper particles uniformly dispersed therein. Black colored aggregates of the surfactant are observed in a phase boundary between the aqueous phase and the benzene phase. These liquid phases are put into a separating funnel, and the upper layer of benzene phase having copper particles dispersed therein is separated. The thus separated benzene dispersion has a copper particle concentration of 4.75 mmol Cu/liter. An aliquot of the benzene dispersion of copper particles is dried on a carbon film to prepare a test solid sample, and the test solid sample is observed through a transmission type electron microscope. As a result, it is found that the dispersion state of copper particles is good and that the average diameter of the copper particles is 6.6 nm, wherein the coefficient of variation is 33.9%. The copper particle dispersion is stable and exhibits no change in the dispersion state even after storage for at least 3 months at room temperature.

EXAMPLE 48

50 ml of the aqueous dispersion of gold particles obtained in Example 1 and 0.0325 g of sodium oleate ($CH_3(CH_2)_7CH=CH(CH_2)_7COONa$, extra pure grade reagent, manufactured and sold by Tokyo Kasei Kogyo Co., Ltd., Japan) are successively added to 25 ml of cyclohexane, and stirred for 4 hours. Before the addition of sodium oleate, the mixture has been heterogeneous in which large droplets are observed. However, after the addition of sodium oleate, emulsification occurs to thereby render the mixture homogeneous. Thereafter, 5.0 g of sodium chloride is added while stirring.

The stirring is discontinued, and then, the mixture is allowed to stand still for 3 hours. The mixture separates into a lower layer of colorless, transparent aqueous phase and an upper layer of red cyclohexane phase having gold particles uniformly dispersed therein. Red colored aggregates of the surfactant are observed in a phase boundary between the aqueous phase and the cyclohexane phase. These liquid phases are put into a separating funnel, and the upper layer of cyclohexane phase having gold particles dispersed therein is separated. The thus separated cyclohexane dispersion has a gold particle concentration of 0.547 mmol Au/liter. That is, a cyclohexane dispersion has been obtained, which has a gold particle concentration as high as 1.90 times that (0.288 mmol Au/liter) of the aqueous dispersion of gold particles used. The gold particle dispersion is stable and exhibits no change in the dispersion state even after storage for at least 3 months at room temperature.

EXAMPLE 49

75 ml of the aqueous dispersion of gold particles obtained in Example 1 and 0.05 g of sodium oleate ($CH_3(CH_2)_7CH=CH(CH_2)_7COONa$, extra pure grade reagent, manufactured and sold by Tokyo Kasei Kogyo Co., Ltd., Japan) are successively added to 25 ml of cyclohexane, and stirred for 4 hours. Before the addition of sodium oleate, the mixture has been heterogeneous in which large droplets are observed. However, after the addition of sodium oleate, emulsification occurs to thereby render the mixture homogeneous. Thereafter, 7.5 g of sodium chloride is added while stirring.

The stirring is discontinued and then, the mixture is allowed to stand still for 3 hours. The mixture separates into a lower layer of colorless, transparent aqueous phase and an upper layer of red cyclohexane phase having gold particles uniformly dispersed therein. Red colored aggregates of the surfactant are observed in a phase boundary between the aqueous phase and the cyclohexane phase. These liquid phases are put into a separating funnel, and the upper layer of cyclohexane phase having gold particles dispersed therein is separated. The thus separated cyclohexane dispersion has a gold particle concentration of 0.821 mmol Au/liter. That is, a cyclohexane dispersion has been obtained, which has a gold particle concentration as high as 2.85 times that (0.288 mmol Au/liter) of the aqueous dispersion of gold particles used. The gold particle dispersion is stable and exhibits no change in the dispersion state even after storage for at least 3 months at room temperature.

EXAMPLE 50

100 ml of the aqueous dispersion of gold particles obtained in Example 1 and 0.0625 g of sodium oleate ($CH_3(CH_2)_7CH=CH(CH_2)_7COONa$, extra pure grade reagent, manufactured and sold by Tokyo Kasei Kogyo Co., Ltd., Japan) are successively added to 25 ml of cyclohexane, and stirred for 4 hours. Before the addition of sodium oleate, the mixture has been heterogeneous in which large droplets are observed. However, after the addition of sodium oleate, emulsification occurs to thereby render the mixture homogeneous. Thereafter, 10 g of sodium chloride is added while stirring.

The stirring is discontinued, and then, the mixture is allowed to stand still for 3 hours. The mixture separates into a lower layer of colorless, transparent aqueous phase and an upper layer of red cyclohexane phase having gold particles uniformly dispersed therein. Red colored aggregates of the surfactant are observed in a phase boundary between the aqueous phase and the cyclohexane phase. These liquid phases are put into a separating funnel, and the upper layer of cyclohexane phase having gold particles dispersed therein is separated. The thus separated cyclohexane dispersion has a gold particle concentration of 1.094 mmol Au/liter. That is, a cyclohexane dispersion has been obtained, which has a gold particle concentration as high as 3.80 times that (0.288 mmol Au/liter) of the aqueous dispersion of gold particles used. The gold particle dispersion is stable and exhibits no change in the dispersion state even after storage for at least 3 months at room temperature.

EXAMPLE 51

To 25 ml of chloroform are successively added 25 ml of the aqueous dispersion of gold particles obtained in Example 6 and 0.025 g of trimethylstearylammonium chloride ($[C_{18}H_{37}N(CH_3)_3]Cl$, extra pure grade reagent, manufactured and sold by Tokyo Kasei Kogyo Co., Ltd., Japan) as a surfactant, and the resultant mixture has been stirred for 4 hours. Prior to the addition of the trimethylstearylammonium chloride, the mixture has been heterogeneous in which large droplets are observed. However, after the addition of the trimethylstearylammonium chloride, emulsification occurs to thereby render the mixture homogeneous. Thereafter, 1.12 g of sodium chloride is added thereto and stirred.

After the stirring, the mixture is allowed to stand still for 3 hours. The mixture separates into an upper layer of colorless transparent aqueous phase and a lower layer of red chloroform phase having gold particles uniformly dispersed therein. Red colored aggregates of the surfactant are observed in a phase boundary between the aqueous phase and the chloroform phase. These liquid phases are put into a separating funnel, and only the chloroform phase having gold particles dispersed therein is separated. The thus separated chloroform dispersion has a gold particle concentration of 0.274 mmol Au/liter. An aliquot of the chloroform dispersion of gold particles is dried on a carbon film to prepare a test solid sample, and the test solid sample is observed through a transmission type electron microscope. As a result, it is found that the dispersion state of gold particles is good and that the average diameter of the gold particles is 13.5 nm, wherein the coefficient of variation is 26.3%. The gold particle dispersion is stable and exhibits no change in the dispersion state even after storage for at least 6 months at room temperature.

EXAMPLE 52

To 25 ml of chloroform are successively added 25 ml of the aqueous dispersion of gold particles obtained in Example 6 and 0.025 g trimethylstearylammonium chloride ($[C_{18}H_{37}N(CH_3)_3]Cl$, extra pure grade reagent, manufactured and sold by Tokyo Kasei Kogyo Co., Ltd., Japan) as a surfactant, and the resultant mixture is stirred for 4 hours. Prior to the addition of the trimethylstearylammonium chloride, the mixture has been heterogeneous in which large droplets are observed. However, after the addition of the trimethylstearylammonium chloride, emulsification occurs to thereby render the mixture homogeneous. Thereafter, a solution of 1.12 g of sodium chloride in 3 ml of distilled water is added thereto and stirred.

After the stirring, the mixture is allowed to stand still for 3 hours. The mixture separates into an upper layer of colorless, transparent aqueous phase and a lower layer of red chloroform phase having gold particles uniformly dispersed therein. Red colored aggregates of the surfactant are observed in a phase boundary between the aqueous phase and the chloroform phase. These liquid phases are put into a separating funnel, and only the lower layer of chloroform phase having gold particles dispersed therein is separated. The thus separated chloroform dispersion has a gold particle concentration of 0.274 mmol Au/liter. An aliquot of the chloroform dispersion of gold particles is dried on a carbon film to prepare a test solid sample, and the test solid sample is observed through a transmission type electron microscope. As a result, it is found that the dispersion state of gold particles is good and that the average diameter of the gold particles is 15.1 nm, wherein the coefficient of variation is 9.51%. The gold particle dispersion is stable and exhibits no change in the dispersion state even after storage for at least 4 months at room temperature.

EXAMPLE 53

To 25 ml of chloroform are successively added 25 ml of the aqueous dispersion of gold particles obtained in Example 6 and 0.025 g of trimethylstearylammonium chloride ($[C_{18}H_{37}N(CH_3)_3]Cl$, extra pure grade reagent, manufactured and sold by Tokyo Kasei Kogyo Co., Ltd., Japan) as a surfactant, and the resultant mixture is stirred for 4 hours. Prior to the addition of the trimethylstearylammonium chloride, the mixture has been heterogeneous in which large droplets are observed. However, after the addition of the trimethylstearylammonium chloride, emulsification occurs to thereby render the mixture homogeneous. Thereafter, 0.35 g of magnesium chloride is added thereto and stirred.

After discontinuing the stirring, the mixture is allowed to stand still for 3 hours. The mixture separates into an upper layer of colorless transparent aqueous phase and a lower layer of red chloroform phase having gold particles uniformly dispersed therein. These liquid phases are put into a separating funnel, and only the chloroform phase having gold particles dispersed therein is separated. The thus separated chloroform dispersion has a gold particle concentration of 0.274 mmol Au/liter. An aliquot of the chloroform dispersion of gold particles is dried on a carbon film to prepare a test solid sample, and the test solid sample is observed through a transmission type electron microscope. As a result, it is found that the dispersion state of gold particles is good and that the average diameter of the gold particles is 15.2 nm, wherein the coefficient of variation is 28.6%. The gold particle dispersion is stable and exhibits no change in the dispersion state even after storage for at least 6 months at room temperature.

EXAMPLE 54

To 25 ml of chloroform are successively added 25 ml of the aqueous dispersion of gold particles obtained in Example 6 and 0.025 g trimethylstearylammonium chloride ($[C_{18}H_{37}N(CH_3)_3]Cl$, extra pure grade reagent, manufactured and sold by Tokyo Kasei Kogyo Co., Ltd., Japan) as a surfactant, and the resultant mixture is stirred for 4 hours. Prior to the addition of the trimethylstearylammonium chloride, the mixture has been heterogeneous in which large droplets are observed. However, after the addition of the trimethylstearylammonium chloride, emulsification occurs to thereby render the mixture homogeneous. Thereafter, a solution obtained by dissolving 0.35 g of magnesium chloride in 3 ml of water is added thereto and stirred.

After discontinuing the stirring, the mixture is allowed to stand still for 3 hours. The mixture separates into an upper layer of colorless transparent aqueous phase and a lower layer of red chloroform phase having gold particles uniformly dispersed therein. These liquid phases are put into a separating funnel, and only the lower layer of chloroform phase having gold particles dispersed therein is separated. The thus separated chloroform dispersion has a gold particle concentration of 0.274 mmol Au/liter. An aliquot of the chloroform dispersion of gold particles is dried on a carbon film to prepare a test solid sample, and the test solid sample is observed through a transmission type electron microscope. As a result, it is found that the dispersion state of gold particles is good and that the average diameter of the gold particles is 13.2 nm, wherein the coefficient of variation is 18.2%. The gold particle dispersion is stable and exhibits no change in the dispersion state even after storage for at least 4 months at room temperature.

EXAMPLE 55

To 25 ml of tetrachloromethane are successively added 25 ml of the aqueous dispersion of gold particles obtained in Example 6 and 0.025 g of sodium oleate ($CH_3(CH_2)_7CH=CH(CH_2)_7COONa$, extra pure grade reagent, manufactured and sold by Tokyo Kasei Kogyo Co., Ltd., Japan)

as a surfactant, and the resultant mixture is stirred for 4 hours. Prior to the addition of the sodium oleate, the mixture has been heterogeneous in which large droplets are observed. However, after the addition of the sodium oleate, emulsification occurs to thereby render the mixture homogeneous. Thereafter, 1.12 g of sodium chloride is added thereto and stirred.

After discontinuing the stirring, the mixture is allowed to stand still for 3 hours. As a result, it separates into an upper layer of colorless transparent aqueous phase and a lower layer of purple carbon tetrachloride phase having gold particles uniformly dispersed therein. Purple colored aggregates of the surfactant are observed in a phase boundary between the aqueous phase and the carbon tetrachloride phase. These liquid phases are put into a separating funnel, and only the carbon tetrachloride phase having gold particles dispersed therein is separated. The thus separated carbon tetrachloride dispersion has a gold particle concentration of 0.274 mmol Au/liter. An aliquot of the carbon tetrachloride dispersion of gold particles is dried on a carbon film to prepare a test solid sample, and the test solid sample is observed through a transmission type electron microscope. As a result, it is found that the dispersion state of gold particles is good and that the average diameter of the gold particles is 16.5 nm, wherein the coefficient of variation is 64.5%. The gold particle dispersion is stable and exhibits no change in the dispersion state even after storage for at least 2 months at room temperature.

EXAMPLE 56

To 25 ml of carbon tetrachloride are successively added 25 ml of the aqueous dispersion of gold particles obtained in Example 6 and 0.025 g of sodium oleate ($CH_3(CH_2)_7CH=CH(CH_2)_7COONa$, extra pure grade reagent, manufactured and sold by Tokyo Kasei Kogyo Co., Ltd., Japan) as a surfactant, and the resultant mixture is stirred for 4 hours. Prior to the addition of the sodium oleate, the mixture has been heterogeneous in which large droplets are observed. However, after the addition of the sodium oleate, emulsification occurs to thereby render the mixture homogeneous. Thereafter, a solution obtained by dissolving 1.12 g of sodium chloride in 3 ml of water is added thereto and stirred.

After discontinuing the stirring, the mixture is allowed to stand still for 3 hours. The mixture separates into an upper layer of colorless transparent aqueous phase and a lower layer of purple carbon tetrachloride phase having gold particles uniformly dispersed therein. Purple colored aggregates of the surfactant are observed in a phase boundary between the aqueous phase and the carbon tetrachloride phase. These liquid phases are put into a separating funnel, and only the carbon tetrachloride phase having gold particles dispersed therein is separated. The thus separated carbon tetrachloride dispersion has a gold particle concentration of 0.274 mmol Au/liter. An aliquot of the carbon tetrachloride dispersion of gold particles is dried on a carbon film to prepare a test solid sample, and the test solid sample is observed through a transmission type electron microscope. As a result, it is found that the dispersion state of gold particles is good and that the average diameter of the gold particles is 19.2 nm, wherein the coefficient of variation is 39.4 %. The gold particle dispersion is stable and exhibits no change in the dispersion state even after storage for at least 2 months at room temperature.

EXAMPLE 57

To 25 ml of tetrachloromethane are successively added 25 ml of the aqueous dispersion of gold particles obtained in Example 6 and 0.025 g of sodium oleate ($CH_3(CH_2)_7CH=CH(CH_2)_7COONa$, extra pure grade reagent, manufactured and sold by Tokyo Kasei Kogyo Co., Ltd., Japan) as a surfactant, and the resultant mixture has been stirred for 4 hours. Prior to the addition of the sodium oleate, the mixture is heterogeneous in which large droplets are observed. However, after the addition of the sodium oleate, emulsification occurs to thereby render the mixture homogeneous. Thereafter, 0.35 g of magnesium chloride is added thereto and stirred.

After discontinuing the stirring, the mixture is allowed to stand still for 3 hours. As a result, it separates into an upper layer of colorless transparent aqueous phase and a lower layer of purple carbon tetrachloride phase having gold particles uniformly dispersed therein. Purple colored aggregates of the surfactant are observed in a phase boundary between the aqueous phase and the carbon tetrachloride phase. These liquid phases are put into a separating funnel, and only the carbon tetrachloride phase having gold particles dispersed therein is separated. The thus separated carbon tetrachloride dispersion has a gold particle concentration of 0.274 mmol Au/liter. An aliquot of the carbon tetrachloride dispersion of gold particles is dried on a carbon film to prepare a test solid sample, and the test solid sample is observed through a transmission type electron microscope. As a result, it is found that the dispersion state of gold particles is good and that the average diameter of the gold particles is 14.3 nm, wherein the coefficient of variation is 27.0%. The gold particle dispersion is stable and exhibits no change in the dispersion state even after storage for at least 2 months at room temperature.

EXAMPLE 58

To 25 ml of carbon tetrachloride are successively added 25 ml of the aqueous dispersion of gold particles obtained in Example 6 and 0.025 g of sodium oleate ($CH_3(CH_2)_7CH=CH(CH_2)_7COONa$, extra pure grade reagent, manufactured and sold by Tokyo Kasei Kogyo Co., Ltd., Japan) as a surfactant, and the resultant mixture is stirred for 4 hours. Prior to the addition of the sodium oleate, the mixture has been heterogeneous in which large droplets are observed. However, after the addition of the sodium oleate, emulsification occurs to thereby render the mixture homogeneous. Thereafter, a solution obtained by dissolving 0.35 g of magnesium chloride in 3 ml of water is added thereto and stirred.

After discontinuing the stirring, the mixture is allowed to stand still for 3 hours. As a result, it separates into an upper layer of colorless transparent aqueous phase and a lower layer of purple carbon tetrachloride phase having gold particles uniformly dispersed therein. Purple colored aggregates of the surfactant are observed in a phase boundary between the aqueous phase and the carbon tetrachloride phase. These liquid phases are put into a separating funnel, and only the carbon tetrachloride phase having gold particles dispersed therein is separated. The thus separated carbon tetrachloride dispersion has a gold particle concentration of 0.274 mmol Au/liter. An aliquot of the carbon tetrachloride dispersion of gold particles is dried on a carbon film to prepare a test solid sample, and the test solid sample is observed through a transmission type electron microscope. As a result, it is found that the dispersion state of gold particles is good and that the average diameter of the gold particles is 14.0 nm, wherein the coefficient of variation is 28.7 %. The gold particle dispersion is stable and exhibits no change in the dispersion state even after storage for at least 2 months at room temperature.

EXAMPLE 59

To 25 ml of cyclohexane are successively added 25 ml of the aqueous dispersion of gold particles obtained in Example 6 and 0.025 g of sodium oleate ($CH_3(CH_2)_7CH=CH(CH_2)_7COONa$, extra pure grade reagent, manufactured and sold by Tokyo Kasei Kogyo Co., Ltd., Japan) as a surfactant, and the resultant mixture is stirred for 4 hours. Prior to the addition of the sodium oleate, the mixture has been heterogeneous in which large droplets are observed. However, after the addition of the sodium oleate, emulsification occurs to thereby render the mixture homogeneous. Thereafter, 0.35 g of magnesium chloride is added thereto and stirred.

After discontinuing the stirring, the mixture is allowed to stand still for 3 hours. As a result, it separates into a lower layer of colorless, transparent aqueous phase and an upper layer of red cyclohexane phase having gold particles uniformly dispersed therein. These liquid phases are put into a separating funnel, and only the cyclohexane phase having gold particles dispersed therein is separated. The thus separated cyclohexane dispersion has a gold particle concentration of 0.274 mmol Au/liter. An aliquot of the cyclohexane dispersion of gold particles is dried on a carbon film to prepare a test solid sample, and the test solid sample is observed through a transmission type electron microscope. As a result, it is found that the dispersion state of gold particles is good and that the average diameter of the gold particles is 13.7 nm, wherein the coefficient of variation is 14.6%. The gold particle dispersion is stable and exhibits no change in the dispersion state even after storage for at least 6 months at room temperature.

EXAMPLE 60

To 25 ml of cyclohexane are successively added 25 ml of the aqueous dispersion of gold particles obtained in Example 6 and 0.025 g of sodium oleate ($CH_3(CH_2)_7CH=CH(CH_2)_7COONa$, extra pure grade reagent, manufactured and sold by Tokyo Kasei Kogyo Co., Ltd., Japan) as a surfactant, and the resultant mixture is stirred for 4 hours. Prior to the addition of the sodium oleate, the mixture has been heterogeneous in which large droplets are observed. However, after the addition of the sodium oleate, emulsification occurs to thereby render the mixture homogeneous. Thereafter, a solution obtained by dissolving 0.35 g of magnesium chloride in 3 ml of water is added thereto and stirred.

After discontinuing the stirring, the mixture is allowed to stand still for 3 hours. As a result, it separates into a lower layer of colorless, transparent aqueous phase and an upper layer of red cyclohexane phase having gold particles uniformly dispersed therein. These liquid phases are put into a separating funnel, and only the cyclohexane phase having gold particles dispersed therein is separated. The thus separated cyclohexane dispersion has a gold particle concentration of 0.274 mmol Au/liter. An aliquot of the cyclohexane dispersion of gold particles is dried on a carbon film to prepare a test solid sample, and the test solid sample is observed through a transmission type electron microscope. As a result, it is found that the dispersion state of gold particles is good and that the average diameter of the gold particles is 13.8 nm, wherein the coefficient of variation is 16.7%. The gold particle dispersion is stable and exhibits no change in the dispersion state even after storage for at least 6 months at room temperature.

EXAMPLE 61

To 25 ml of n-hexane are successively added 25 ml of the aqueous dispersion of gold particles obtained in Example 6 and 0.025 g of sodium oleate ($CH_3(CH_2)_7CH=CH(CH_2)_7COONa$, extra pure grade reagent, manufactured and sold by Tokyo Kasei Kogyo Co., Ltd., Japan) as a surfactant, and the resultant mixture is stirred for 4 hours. Prior to the addition of the sodium oleate, the mixture has been heterogeneous in which large droplets are observed. However, after the addition of the sodium oleate, emulsification occurs to thereby render the mixture homogeneous. Thereafter, 0.35 g of magnesium chloride is added thereto and stirred.

After discontinuing the stirring, the mixture is allowed to stand still for 3 hours. The mixture separates into a lower layer of colorless, transparent aqueous phase and an upper layer of red n-hexane phase having gold particles uniformly dispersed therein. These liquid phases are put into a separating funnel, and only the n-hexane phase having gold particles dispersed therein is separated. The thus separated n-hexane dispersion has a gold particle concentration of 0.274 mmol Au/liter. An aliquot of the n-hexane dispersion of gold particles is dried on a carbon film to prepare a test solid sample, and the test solid sample is observed through a transmission type electron microscope. As a result, it is found that the dispersion state of gold particles is good and that the average diameter of the gold particles is 14.0 nm, wherein the coefficient of variation is 17.0%. The gold particle dispersion is stable and exhibits no change in the dispersion state even after storage for at least 5 months at room temperature.

EXAMPLE 62

To 25 ml of n-hexane are successively added 25 ml of the aqueous dispersion of gold particles obtained in Example 6 and 0.025 g of sodium oleate ($CH_3(CH_2)_7$—$CH=CH(CH_2)_7COONa$, extra pure grade reagent, manufactured and sold by Tokyo Kasei Kogyo Co., Ltd., Japan) as a surfactant, and the resultant mixture is stirred for 4 hours. Prior to the addition of the sodium oleate, the mixture has been heterogeneous in which large droplets are observed. However, after the addition of the sodium oleate, emulsification occurs to thereby render the mixture homogeneous. Thereafter, a solution obtained by dissolving 0.35 g of magnesium chloride in 3 ml of water is added thereto and stirred.

After discontinuing the stirring, the mixture is allowed to stand still for 3 hours. As a result, it separates into a lower layer of colorless, transparent aqueous phase and an upper layer of purple n-hexane phase having gold particles uniformly dispersed therein. These liquid phases are put into a separating funnel, and only the n-hexane phase having gold particles dispersed therein is separated. The thus separated n-hexane dispersion has a gold particle concentration of 0.274 mmol Au/liter. An aliquot of the n-hexane dispersion of gold particles is dried on a carbon film to prepare a test solid sample, and the test solid sample is observed through a transmission type electron microscope. As a result, it is found that the dispersion state of gold particles is good and that the average diameter of the gold particles is 13.6 nm, wherein the coefficient of variation is 16.7%. The gold particle dispersion is stable and exhibits no change in the dispersion state even after storage for at least 6 months at room temperature.

What is claimed is:

1. A method for preparing a non-aqueous liquid dispersion of particles of at least one member selected from the group consisting of a metal and a metal compound, which comprises:

(a) providing an aqueous dispersion of particles of at least one member selected from the group consisting of a metal and a metal compound, said metal being at least one member selected from the group consisting of gold, silver, platinum, rhodium, palladium, ruthenium, iridium and osmium, said metal compound being at least one member selected from the group consisting of metal borides, metal sulfides, metal hydroxides and metal oxides, wherein said metal species of said metal compound is at least one member selected from the group consisting of iron, nickel, cobalt, cadmium, copper, barium, aluminum, indium, tin, titanium, tantalum, silicon and zirconium;

(b) contacting said aqueous dispersion and a surfactant, said surfactant being at least one member selected from the group consisting of an alkali metal salt of a fatty acid, a higher alcohol sulfate ester, an alkali metal salt of an alkylbenzenesulfonic acid, an alkyl chain-containing primary amine salt, an alkyl chain-containing secondary amine salt, an alkyl chain-containing tertiary amine salt, an alkyl chain-containing quaternary ammonium salt, an alkyl chain-containing pyridinium salt, an ester of a polyhydric alcohol with a fatty acid, an ethylene oxide polymerization adduct, a sulfobetaine type surfactant, a betaine type surfactant, an amino acid type surfactant, a quaternary ammonium salt having at least two long alkyl chains, and an adduct of a sulfonic acid group to a diester of succinic acid with a higher alcohol, said surfactant being used in an amount of from 0.001 to 2% by weight, based on the weight of water of said aqueous dispersion, with a water-immiscible, non-aqueous liquid in the presence or absence of at least one salt selected from the group consisting of a water-soluble inorganic acid salt and a water-soluble organic acid salt exhibiting substantially no surface activity, said at least one salt being selected from the group consisting of sulfates, halides, acetates, nitrates, carbonates, citrates and tartrates of ammonium, lithium, sodium, potassium, magnesium, calcium, strontium, barium, aluminum and lanthanum, said at least one salt being used in an amount of from 0.005 to 30% by weight, based on the weight of water of said aqueous dispersion, and wherein when the contacting of said aqueous dispersion with said non-aqueous liquid is conducted in the absence of said at least one salt, said at least one salt is added after said contacting, thereby causing said particles to migrate from said aqueous dispersion into said non-aqueous liquid to obtain a two-phase system comprised of a non-aqueous dispersion phase comprising said non-aqueous liquid having said particles dispersed therein and an aqueous phase substantially free of said particles; and (c) isolating said non-aqueous dispersion phase from said two-phase mixture.

2. The method according to claim 1, wherein the volume of said non-aqueous liquid is from 0.01 to 50 times the volume of said aqueous dispersion.

3. The method according to claim 2, wherein the volume of said non-aqueous liquid is smaller than the volume of water of said aqueous dispersion.

4. The method according to claim 1, wherein said aqueous dispersion further contains an organic polymer having a protective colloid activity.

5. The method for preparing a non-aqueous dispersion of particles according to claim 4, wherein the organic polymer is used in an amount of from 0.01 to 500 in terms of a molar ratio of monomer units of the organic polymer to metal atoms of the metal or metal compound.

6. The method for preparing a non-aqueous dispersion of particles according to claim 4, wherein the organic polymer is selected from the group consisting of poly(N-vinyl-2-pyrrolidone), poly(vinylalcohol), a copolymer of N-vinyl-2-pyrrolidone and acrylamide or methylacrylate, poly (methyl vinyl ether), gelatin, sodium casein and gum arabic.

7. The method according to claim 1, wherein the contacting non-aqueous liquid contains particles of at least one member selected from the group consisting of a metal and a metal compound, wherein said particles contained in said contacting non-aqueous liquid are the same as or different from the particles of said aqueous dispersion to be contacted with said contacting non-aqueous liquid.

8. The method according to claim 1, wherein the contacting of said aqueous dispersion with said non-aqueous liquid in step (1) is performed by mixing said aqueous dispersion and said non-aqueous liquid while stirring.

9. The method for preparing a non-aqueous dispersion of particles according to claim 1, wherein said aqueous dispersion further comprises a polar solvent selected from the group consisting of methyl alcohol and ethyl alcohol as a dispersion medium.

10. The method according to claim 1, wherein said metal species of said metal compound is at least one member selected from the group consisting of iron, nickel, cobalt, cadmium, copper, barium, indium, tin, titanium, tantalum, silicon and zirconium, and said at least one salt being selected from the group consisting of sulfates, halides, acetates, nitrates, carbonates, citrates and tartrates of ammonium, lithium, sodium, potassium, magnesium, calcium, strontium, barium and lanthanum.

11. The method for preparing a non-aqueous dispersion of particles according to claim 1, where the metal particle is obtained by reducing a metal compound selected from the group consisting of chloroauric acid, silver nitrate, chloroplatinic acid, rhodium (III) chloride, palladium (II) chloride, ruthenium (III) chloride, chloroiridium acid salt and osmium (VII) oxide.

12. The method for preparing a non-aqueous dispersion of particles according to claim 1, wherein the water-immiscible, non-aqueous liquid is selected from the group consisting of chloroform, cyclohexane, benzene, n-hexane, diethylether, methylisobutylketone, carbon tetrachloride, methylene chloride, ethyl acetate, petroleum ether and silicone oil.

13. The method for preparing a non-aqueous dispersion of particles according to claim 1, wherein said surfactant is used in an amount of from 0.05 to 0.5% by weight, based on the weight of water of said aqueous dispersion.

14. The method for preparing a non-aqueous dispersion of particles according to claim 1, wherein the volume of said non-aqueous liquid is from 0.05 to 10 times the volume of said aqueous dispersion.

15. The method for preparing a non-aqueous dispersion of particles according to claim 1, wherein said at least one salt is used in an amount of from 0.01 to 15% by weight, based on the weight of water of said aqueous dispersion.

* * * * *